United States Patent
Cardona et al.

(10) Patent No.: US 11,526,711 B1
(45) Date of Patent: Dec. 13, 2022

(54) SYNCHRONIZING IMAGE DATA WITH EITHER VEHICLE TELEMATICS DATA OR INFRASTRUCTURE DATA PERTAINING TO A ROAD SEGMENT

(71) Applicant: STATE FARM MUTUAL AUTOMOBILE INSURANCE COMPANY, Bloomington, IL (US)

(72) Inventors: Alexander Cardona, Gilbert, AZ (US); Kip Wilson, Cave Creek, AZ (US); David Frank, Tempe, AZ (US); Phillip Michael Wilkowski, Phoenix, AZ (US); Nolan White, Chandler, AZ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 17/088,402

(22) Filed: Nov. 3, 2020

Related U.S. Application Data

(60) Provisional application No. 63/028,732, filed on May 22, 2020, provisional application No. 63/027,628, filed on May 20, 2020.

(51) Int. Cl.
*G06K 9/62* (2022.01)
*G06F 16/58* (2019.01)
(Continued)

(52) U.S. Cl.
CPC ........... *G06K 9/6289* (2013.01); *G06F 16/29* (2019.01); *G06F 16/54* (2019.01);
(Continued)

(58) Field of Classification Search
CPC .................................................. G06K 9/6289
(Continued)

(56) References Cited

U.S. PATENT DOCUMENTS 7,692,724 B2   4/2010   Arora et al.
7,843,974 B2   11/2010  Hannuksela
(Continued)

FOREIGN PATENT DOCUMENTS

CA      2567074 C      1/2013
EP      2866230 A1     4/2015
WO  WO-2015058610 A1  4/2015

OTHER PUBLICATIONS

Google Inc., "Temporal Synchronization of Multiple Audio Signals". Retrieved from the Internet at: <https://research.google.com/pubs/archive/42193.pdf> on Jan. 26, 2021.
(Continued)

*Primary Examiner* — Daniel T Tekle
(74) *Attorney, Agent, or Firm* — Marshall, Gerstein & Borun LLP

(57) ABSTRACT

Techniques for collecting, synchronizing, and displaying various types of data relating to a road segment enable, via one or more local or remote processors, servers, transceivers, and/or sensors, (i) enhanced and contextualized analysis of vehicle events by way of synchronizing different data types, relating to a monitored road segment, collected via various different types of data sources; (ii) enhanced and contextualized analysis of filed insurance claims pertaining to a vehicle incident at a road segment; (iii) advantageous machine learning techniques for predicting a level of risk assumed for a given vehicle event or a given road segment; (iv) techniques for accounting for region-specific driver profiles when controlling autonomous vehicles; and/or (v) improved techniques for providing a GUI to display collected data in a meaningful and contextualized manner.

20 Claims, 10 Drawing Sheets

(51) Int. Cl.
*G06F 16/54* (2019.01)
*G11B 27/34* (2006.01)
*H04N 7/18* (2006.01)
*G06F 16/29* (2019.01)
*G06V 20/52* (2022.01)

(52) U.S. Cl.
CPC .......... *G06F 16/5866* (2019.01); *G06V 20/52* (2022.01); *G11B 27/34* (2013.01); *H04N 7/18* (2013.01)

(58) Field of Classification Search
USPC ........................................................ 348/149
See application file for complete search history.

(56) References Cited

U.S. PATENT DOCUMENTS

| | | | |
|---|---|---|---|
| 8,189,679 | B2 | 5/2012 | Tsukagoshi et al. |
| 8,238,726 | B2 | 8/2012 | Takatsuji et al. |
| 8,301,007 | B2 | 10/2012 | Ichimura |
| 8,729,446 | B2 | 5/2014 | Verfuerth |
| 9,311,271 | B2 | 4/2016 | Wright |
| 9,371,099 | B2 | 6/2016 | Lagassey |
| 9,633,487 | B2 | 4/2017 | Wright |
| 9,633,560 | B1 | 4/2017 | Gao et al. |
| 9,667,693 | B2 | 5/2017 | Schramm et al. |
| 9,773,281 | B1 | 9/2017 | Hanson |
| 9,886,841 | B1 | 2/2018 | Nave et al. |
| 9,910,443 | B1 | 3/2018 | Lee et al. |
| 10,106,156 | B1 | 10/2018 | Nave et al. |
| 10,178,427 | B2 | 1/2019 | Huang |
| 10,192,369 | B2 | 1/2019 | Wright |
| 10,198,879 | B2 | 2/2019 | Wright |
| 10,269,075 | B2 | 4/2019 | Hsu-Hoffman et al. |
| 10,354,230 | B1 | 7/2019 | Hanson et al. |
| 10,719,966 | B1 | 7/2020 | Davis et al. |
| 10,761,542 | B1 | 9/2020 | Fairfield et al. |
| 10,977,939 | B2 | 4/2021 | Zhang et al. |
| 11,151,870 | B2 | 10/2021 | Xu |
| 11,270,583 | B2 | 3/2022 | Kumar |
| 2003/0093187 | A1 | 5/2003 | Walker |
| 2006/0095199 | A1 | 5/2006 | Lagassey |
| 2011/0015971 | A1 | 1/2011 | Hembury |
| 2011/0161116 | A1 | 6/2011 | Peak et al. |
| 2011/0173015 | A1 | 7/2011 | Chapman et al. |
| 2011/0320492 | A1 | 12/2011 | Inghelbrecht |
| 2012/0123806 | A1 | 5/2012 | Schumann, Jr. et al. |
| 2014/0046701 | A1 | 2/2014 | Steinberg et al. |
| 2014/0136414 | A1 | 5/2014 | Abhyanker |
| 2014/0222321 | A1 | 8/2014 | Petty et al. |
| 2014/0257637 | A1 | 9/2014 | Sangameswaran et al. |
| 2016/0189305 | A1 | 6/2016 | Bogovich et al. |
| 2017/0069001 | A1* | 3/2017 | Scofield ................ H04L 67/306 |
| 2017/0221149 | A1 | 8/2017 | Hsu-Hoffman et al. |
| 2017/0267238 | A1 | 9/2017 | Mimura et al. |
| 2019/0043273 | A1 | 2/2019 | Cordova et al. |
| 2019/0164419 | A1 | 5/2019 | Kumar |
| 2019/0362198 | A1* | 11/2019 | Averbuch ................ G01S 13/87 |
| 2020/0148200 | A1 | 5/2020 | Lerner |
| 2020/0168084 | A1* | 5/2020 | Yang .................... G08G 1/0125 |
| 2020/0226922 | A1* | 7/2020 | Hahn ...................... G08G 1/012 |
| 2020/0312134 | A1 | 10/2020 | Zhang et al. |
| 2021/0142664 | A1 | 5/2021 | Xu |
| 2021/0239478 | A1 | 8/2021 | Mathai et al. |

OTHER PUBLICATIONS

Center for Computer Research in Music and Acoustics, Stanford University, "Clustering and Synchronizing Multi-Camera Video via Landmark Cross-Correlation". Retrieved from the Internet at: <https://ccrma.stanford.edu/~njb/research/icassp2012-multicamera.pdf> on Jan. 26, 2021.

ACM DL Digital Library, "Making a scene: alignment of complete sets of clips based on pairwise audio match". Retrieved from the Internet at: <https://dl.acm.org/doi/10.1145/2324796.2324829> on Jan. 26, 2021.

U.S. Appl. No. 17/088,393, Synchronizing Vehicle Telematics Data With Infrastructure Data Pertaining to a Road Segment, filed Nov. 3, 2020.

U.S. Appl. No. 17/088,412, Analyzing Insurance Claims in Light of Detected Conditions Pertaining to a Road Segment, filed Nov. 3, 2020.

U.S. Appl. No. 17/088,417, Risk Analysis for Vehicle Events and Road Segments Based on Detected Conditions Pertaining to the Road, filed Nov. 3, 2020.

U.S. Appl. No. 17/088,424, Training a Machine-Learning Model Using Detected Conditions at a Road Segment, filed Nov. 3, 2020.

U.S. Appl. No. 17/088,430, Providing a Gui To Enable Analysis of Time-Synchronized Data Sets Pertaining to a Road Segment, filed Nov. 3, 2020.

U.S. Appl. No. 17/088,434, Accounting for Region-Specific Driver Profiles When Controlling Autonomous Vehicles, filed Nov. 3, 2020.

School of Computer Science, Carnegie Mellon University, "Synchronization for Multi-Perspective Videos in the Wild" Retrieved from the Internet at: <http://www.cs.cmu.edu/~poyaoh/data/ICASSP_2017.pdf> on Oct. 6, 2020.

* cited by examiner

SYNCHRONIZING IMAGE DATA WITH EITHER VEHICLE TELEMATICS DATA OR INFRASTRUCTURE DATA PERTAINING TO A ROAD SEGMENT

CROSS-REFERENCE TO RELATED APPLICATIONS

This application claims priority to U.S. Provisional Application Ser. No. 63/027,628, filed on May 20, 2020, entitled "Synchronization, Analysis, and Display of Road Segment Data," and U.S. Provisional Application Ser. No. 63/028,732, filed on May 22, 2020, entitled "Synchronization, Analysis, and Display of Road Segment Data," the entire disclosures of which are expressly incorporated herein by reference.

TECHNICAL FIELD

The present disclosure generally relates to analyzing events at a road segment, and more particularly, to techniques for time-synchronizing and utilizing data from multiple sources to enable a contextualized analysis and review of the events at the road segment.

BACKGROUND

Drivers and passengers assume a certain degree of risk of injury or property damage when travelling by vehicle. This risk may be mitigated by reducing or eliminating certain contributing factors. For example, a driver may avoid risky behavior, such as driving while intoxicated, driving while tired, or driving while texting. As another example, a driver may mitigate the risk of serious injury by driving a car with safety features such as airbags, seatbelts, and antilock brakes.

However, certain risk factors may not be mitigated. For example, the very nature of a vehicle may present certain inherent risks. A typical car may weigh thousands of pounds and may not always maneuver or stop quickly. When travelling at even a moderate speed, a collision may result in serious damage to the vehicle and serious injury to the occupants. Further, a driver or passenger of a vehicle may have no control over perhaps the greatest risk factor involved with driving: other drivers or passengers in other vehicles.

In some situations, environmental factors may contribute to the relative riskiness or safety of an area. For example, a driver approaching a one-lane bridge in a valley between two hills may not see the bridge until the vehicle has crested the hill. If the distance between the hill crest and the bridge is short, the driver may have little time to react if a second driver is approaching the bridge from the other direction. A driver may have little to no control over these environmental factors.

Moreover, environmental factors contributing to the riskiness of an area may not always be readily apparent, observable, or quantifiable. For example, even if a civil engineer identifies a number of intersections as dangerous, she may have no way of quantifying how risky these intersections are relative to one another. Similarly, some driving behaviors may be seemingly risky while resulting in little actual risk exposure, while other seemingly safe driving behaviors may result in a much higher risk exposure than is apparent.

Because environmental factors and driving behaviors contributing to risk may not always be apparent, observable, or quantifiable, these risk factors may go unnoticed. Thus, engineers and government officials may not identify high-risk behaviors and areas, not to mention solutions that may mitigate risk and improve the safety of certain areas and certain driving behaviors. Conventional techniques and experiences may have additional drawbacks as well.

SUMMARY

The described computer-implemented methods and computer systems enable, inter alia, (i) enhanced and contextualized analysis of vehicle events by way of synchronizing different data types, relating to a monitored road segment, collected via various different types of data sources; (ii) enhanced and contextualized analysis of filed insurance claims pertaining to a vehicle incident at a road segment; (iii) advantageous machine learning modeling for predicting a level of risk assumed for a given vehicle event and/or a given road segment; and/or (iv) improved techniques for providing a GUI to display collected data in a meaningful and contextualized manner. A non-exhaustive set of exemplary features of disclosed embodiments are described below. It will be understood that features discussed below may be found in other embodiments not explicitly described and/or in other embodiments described in this Summary or elsewhere in this disclosure.

In a first aspect, a computer-implemented method for synchronizing data from vehicle sensors with data from infrastructure devices may be provided. The method may include, via one or more local or remote processors, servers, transceivers, and/or sensors, any one or more of: (A) detecting a plurality of road segment parameters associated with a road segment during a time-period, wherein the plurality of road segment parameters include first and second sets of parameters existing during the time-period; (B) timestamping the plurality of road segment parameters; (C) time-synchronizing each of the plurality of road segment parameters to one another according to a common clock such that the plurality of road segment parameters is associated with a set of timestamps synchronized to the common clock; (D) storing the plurality of road segment parameters; and/or (E) performing a relevant function using the plurality of road segment parameters. Detecting the plurality of road segment parameters may include: (i) detecting the first set of road segment parameters via one or more vehicle sensors; and/or (ii) detecting the second set of road segment parameters via one or more infrastructure devices disposed relative to the road segment such that the road segment is observable by the one or more infrastructure devices. Performing the relevant function using the plurality of road segment parameters may include: (i) displaying the plurality of road segment parameters via a graphic user interface according to a chronological order determined based upon a the set of timestamps; and/or (ii) analyzing the plurality of road segment parameters to identify one or more vehicle events, each characterized by a subset of the plurality of road segment parameters. The method may include additional, less, or alternate actions, including those discussed elsewhere herein.

In a second aspect, a computer-implemented method for synchronizing road segment parameters with images of a road segment may be provided. The method may, via one or more local or remoter processors, servers, transceivers, and/or sensors, include any one or more of: (A) capturing, via an image sensor, a set of images of an area within a road segment during a time-period; (B) detecting a plurality of road segment parameters associated with the road segment during the time-period, wherein the plurality of road segment parameters includes: (i) a first set of road segment parameters collected via one or more vehicle sensors, and/or (ii) a second set of road segment parameters collected via one or more infrastructure devices disposed proximate to the road segment; (C) timestamping the set of images and the plurality of road segment parameters; (D) time-synchronizing the set of images and the plurality of road segment parameters according to common clock; (E) storing the set of images and the plurality of road segment parameters as a set of stored data such that the set of images and the plurality of road segment parameters are linked to a set of timestamps by which the set of images and the plurality of road segment parameters are referenceable; and/or (F) performing a relevant function using the set of stored data. Performing the relevant function may include one or more of: (i) displaying the set of images and the plurality of road segment parameters according to a chronological order determined based upon the set of timestamps; and/or (ii) analyzing the set of images and the plurality of road segment parameters to identify one or more vehicle events, each characterized by a subset of the set of images and a subset of the plurality of road segment parameters. The method may include additional, less, or alternate actions, including those discussed elsewhere herein.

In a third aspect, a computer-implemented method for analyzing claim data using road segment data may be provided. The method may, via one or more local or remote processors, servers, transceivers, and/or sensors, include any one or more of: (A) retrieving claim data representing one or more insurance claims associated with a vehicle incident at a road segment; (B) analyzing the claim data to identify: (i) a time-period during which the vehicle incident occurred, (ii) a loss alleged to have resulted from the vehicle incident, and/or (iii) one or more alleged conditions alleged to have existed during the time-period; (C) analyzing data captured by an image sensor, a vehicle sensor, and/or an infrastructure device to identify a plurality of road segment parameters representing detected conditions existing during the time-period at the road segment; (D) comparing the one or more claim parameters to the plurality of road segment parameters to identify a status for each of the one or more alleged conditions represented by the one or more claim parameters, wherein each status indicates a degree to which a corresponding alleged condition is corroborated by the one or more detected conditions represented by the plurality of road segment parameters; and/or (E) displaying the one or more statuses for the one or more alleged conditions, such as on a computer display screen. The method may include additional, less, or alternate actions, including those discussed elsewhere herein.

In a fourth aspect, a computer-implemented method for estimating degrees of risk associated with road segments based upon road segment data may be provided. The method may, via one or more local or remote processors, servers, transceivers, and/or sensors, include any one or more of the following: (A) detecting road segment data associated with a road segment during a time-period, wherein the road segment data may include: (i) first data collected via one or more vehicle sensors, (ii) second data collected via one or more infrastructure devices disposed proximate to the road segment, and/or (iii) third data collected via one or more image sensors disposed proximate to the road segment; (B) analyzing the road segment data to identify one or more vehicle events, each characterized by a set of road segment parameters derived from the detected road segment data; (C) calculating a risk index for each of the one or more vehicle events based upon the set of road segment parameters associated with each of the one or more vehicle events; (D) generating a risk score for the road segment based upon the plurality of risk indices; and/or (E) displaying the risk score, such as on a computer display screen. The method may include additional, less, or alternate actions, including those discussed elsewhere herein.

In a fifth aspect, a computer-implemented method for implementing machine learning models to predict risk exposure associated with behaviors may be provided. The method may, via one or more local or remote processors, servers, transceivers, and/or sensors, include any one or more of: (A) detecting a first plurality of road segment parameters associated with a road segment during a time-period, wherein the plurality of road segment parameters may include: (ii) parameters collected via one or more vehicle sensors, and/or (ii) parameters collected via one or more infrastructure devices disposed proximate to the road segment; (B) analyzing the plurality of road segment parameters to identify a plurality of vehicle events, each characterized by a subset of road segment parameters in the plurality of road segment parameters; (C) retrieving claim data representing one or more claims involving one or more vehicle incidents at the road segment; (D) utilizing the plurality of vehicle events and the claim data as training data for a machine learning (ML) model to train the ML model to discover one or more relationships between the plurality of vehicle events and the one or more vehicle incidents represented by the claim data, wherein the one or more relationships include a relationship between a given type of vehicle event and a frequency or severity of the vehicle incidents associated with the vehicle event; and/or (E) analyzing a second plurality of road segment parameters to determine that the second plurality of road segment parameters represent a particular vehicle event of the given type and to predict, based upon the relationship, a level of risk exposure for the particular vehicle event. The method may include additional, less, or alternate actions, including those discussed elsewhere herein.

In a sixth aspect, a computer-implemented method for providing a graphic user interface (GUI) to facilitate analyzing vehicle events at a road segment may be provided. The method may, via one or more local or remote processors, servers, transceivers, and/or sensors, include any one or more of the following: (A) displaying a graphic user interface (GUI) configured to display at least one of a series of images, the GUI including an image control element interactable to advance forward or backward in time through the series of images; (B) analyzing a displayed image from the series of images displayed within the GUI to identify a timestamp for the displayed image; (C) retrieving one or more values for one or more road segment parameters based upon the identified timestamp, such that the one or more values are relevant-in-time to the displayed image; and/or (D) displaying the one or more values for the one or more road segment parameters simultaneous to the displaying of the displayed image, such that the one or more values, relevant-in-time to the displayed image, are simultaneously viewable with the displayed image. The method may include additional, less, or alternate actions, including those discussed elsewhere herein.

In a seventh aspect, a computer-implemented method for accounting for region-specific driver profiles when controlling autonomous vehicles may be provided. This method may enable more precise autonomous control of a vehicle, accounting for typical or expected driver tendencies and driving conditions in a region. The method may, via one or more local or remote processors, servers, transceivers, and/or sensors, include any one or more of the following:

analyzing road segment data pertaining to a region, wherein the road segment data includes a (i) first set of data detected via one or more vehicle sensors in vehicles traveling in the region; and (ii) a second set of data detected via one or more infrastructure devices associated with infrastructure in the region; generating, based on the road segment data, a plurality of driver profiles corresponding to a plurality of vehicles identifiable from the road segment data, wherein each driver profile includes one or more metrics relating to driving behavior of a vehicle from the plurality of vehicles to which it corresponds; generating, based on an analysis of the plurality or driver profiles, a model driver profile for the region; updating an autonomous control profile for a vehicle based on the model driver profile for the region; and/or autonomously controlling the vehicle based on the updated autonomous control profile. The method may include additional, less, or alternate actions, including those discussed elsewhere herein Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The described computer-implemented methods and computer systems enable, inter alia, (i) enhanced and contextualized analysis of vehicle events by way of synchronizing different data types, relating to a monitored road segment, collected via various different types of data sources; (ii) enhanced and contextualized analysis of filed insurance claims pertaining to a vehicle incident at a road segment; (iii) advantageous machine learning modeling for predicting a level of risk assumed for a given vehicle event and/or a given road segment; and/or (iv) improved techniques for providing a GUI to display collected data in a meaningful and contextualized manner. Various techniques, systems, and methods are discussed below with reference to FIGS. 1-9.

I. Exemplary Communication System

Figure 1:
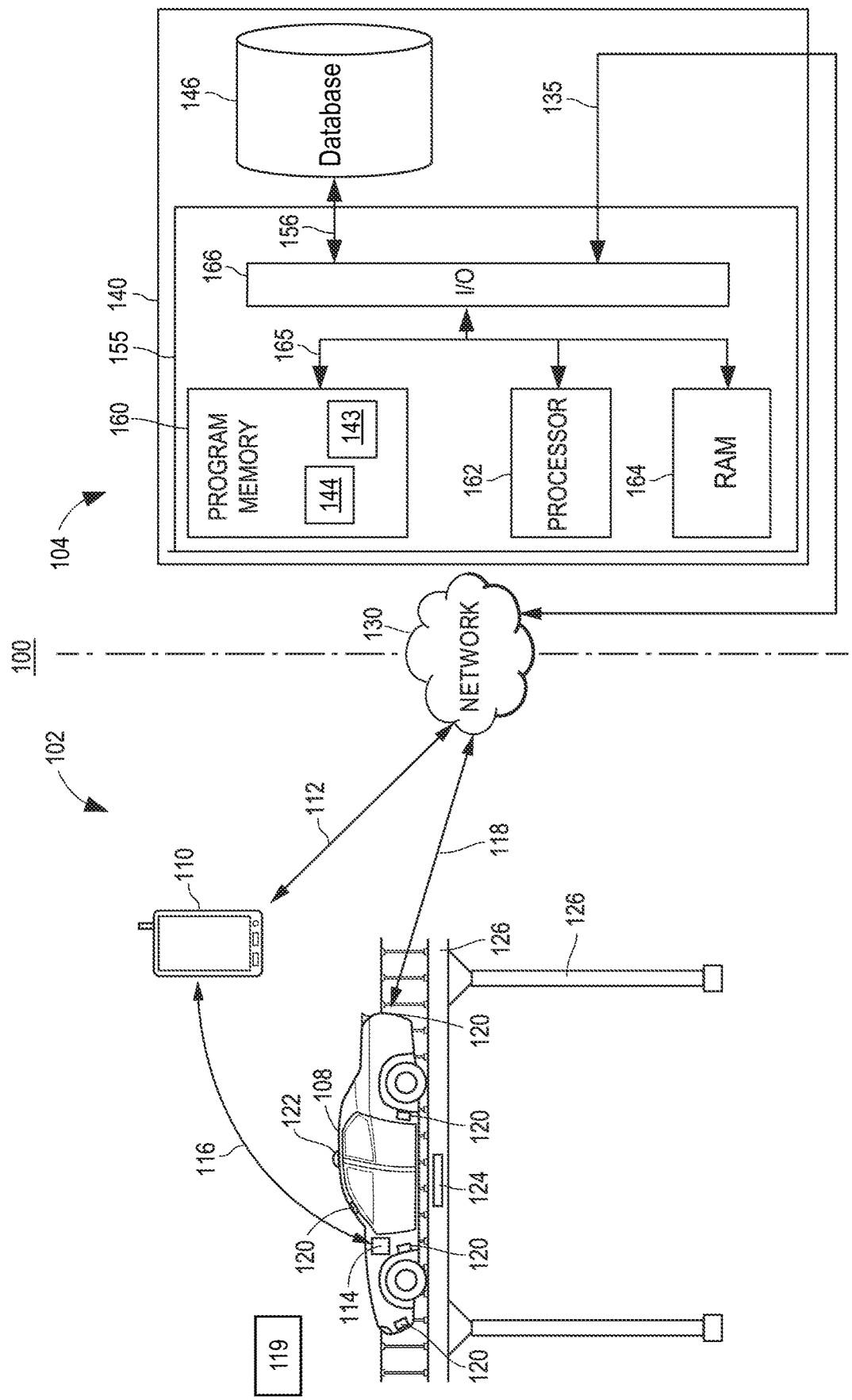
FIG. 1 is a block diagram of an exemplary interconnected wireless communication system by which the methods described herein may be implemented, according to one embodiment.

FIG. 1 is a block diagram of an exemplary interconnected wireless communication system 100 by which the methods described herein may be implemented. At a high level, the system 100 enables the detection of various different types of data associated with a road segment (e.g., an intersection, a portion of a road, a bridge, etc.), any one or more of which can be time-stamped, time-synchronized, and stitched together to enable a more comprehensive analysis of events that have occurred at the road segment.

Exemplary data types include image data captured by image sensor(s), vehicle sensor data captured by one or more sensors disposed within or on a vehicle (including vehicle telematics data, such as acceleration, braking, cornering, speed, location, route, and other information), and infrastructure device data captured by infrastructure device(s) disposed within or proximate to infrastructure components (e.g., traffic signals, traffic signs, the road, crosswalks, crosswalk signs/signals, billboard structures, building walls near a road segment, garbage or recycling bins, mail boxes, etc.).

The captured data may be referred to as "road segment data," and parameters derived from such data may be referred to as "road segment parameters." Images derived from or represented by the captured image data may be referred to as "road segment images."

As an example, a camera may capture images or video of a road segment during a given time-period, a vehicle telematics system may capture vehicle sensor data (e.g., speed, position, heading, braking, etc.) while a vehicle is at the road segment during the given time-period, and an infrastructure device may capture infrastructure device data relating to an infrastructure component or relating to the general environment at the road segment (e.g., detected speed or motion of one or more vehicles or pedestrians, detected light, detected weather conditions, detected infrastructure component status or condition such as a traffic signal status, etc.) during the given time-period. Any two or three of these three types of data (e.g., image data, vehicle sensor data, infrastructure device data) may be time-stamped, time-synchronized, and stitched.

The synchronization functionality described herein may involve synchronizing different data and/or data types based on (i) clocks or time-stamps for each of the synchronized data and/or data types, (ii) one or more audio events or "fingerprints" detected in each of the different data or data types (e.g., horns, sirens, sounds associated with a vehicle crash, or any other distinct sound or audio pattern); (iii) one or more visual events or "fingerprints" detected in each of the different data or data types (e.g., the detection of particular street light colors, vehicles, daylight and/or shadow patterns, etc.), or (iv) some combination thereof.

Generally speaking, the synchronization functionality enables an "enrichment" of detected telematics data (e.g., speed, position, heading, braking, etc.) by enabling systems and users to observe "events" that correspond in time and place to the telematics data, thereby improving an understanding of the telematics data by contextualizing it. For example, two otherwise identical hard braking incidents may represent different levels of risk or danger depending on the context (e.g., the status of street lights, the proximity to other vehicles, the road conditions, the weather conditions, the visibility conditions, etc.). For example, a first hard braking incident may be classified as negligent due to the driver following another vehicle too closely, and a second hard braking incident may be classified as justified because the driver was avoiding an unexpected obstacle, such as a second car running a red light. This contextualized telematics data may be used to train a machine learning model, enabling it to facilitate improved risk analysis and risk scoring of events based telematics data and other road segment data (e.g., when compared to vehicle telematics data that is analyzed in isolation from other data).

Staying with the concept of detected "events," the stitched data can facilitate insurance claims analysis by enabling someone to detect an event (e.g., a vehicle crash) in one type of data (e.g., video or image data) and cross check various aspects of the event with one or more of the other types of data (e.g., vehicle speed from vehicle sensor data or a traffic light signal status from infrastructure device data). This may facilitate an analysis by a claims adjustor, for example, who is analyzing an insurance claim relating to an accident. For example, one can easily detect an event represented in one of these data types (e.g., a traffic signal sensor detecting vehicle motion while the signal is red, indicating a red-light violation) and cross-check with the other types of data (e.g., video of the intersection at the time and/or collected vehicle sensor data from vehicles at the intersection at the same time) to better understand what occurred at the road segment.

Further, the stitched data may be utilized to identify high-risk driving behaviors (e.g., by identifying one or more behaviors that tend to occur before an accident) and high-risk road segments (e.g., by identifying road segments experiencing a high number of high-risk behaviors and/or accidents). Advantageously, the described techniques enable large scale behavior analysis. For example, entire regions (e.g., neighborhoods, cities, or particular regions of communities) could be analyzed by analyzing a representative set of drivers in the region for a representative period of time. At a high level, this enables an understanding of how risky or "good" or "bad" the "typical" driver is in a region. Based on a generic profile of a "typical" driver in a region, for example, various parameters for an autonomous or semi-autonomous vehicle might be set differently (e.g., for riskier "typical drivers, an autonomous vehicle may maintain more distance between itself and other vehicles). The "typical" driver information could also be provided to users (e.g., other drivers, bike riders, pedestrians on sidewalks, etc.) to improve their understanding of drivers in the region.

In some instances, any desired combination of road segment data (e.g., images, vehicle sensor data, or infrastructure device data) and claim data may be fed to a machine-learning (ML) algorithm, which may automatically identify correlations between certain patterns in different types of road segment data or between road segment data and the claim data. As an example, approaching a yellow light above a certain threshold may result in a higher or lower number of accidents than approaching the yellow light below the certain threshold. The ML algorithm may identify this threshold (or any other pattern corresponding to a higher number of accidents), assuming the pattern exists in the data. At that point, the identified pattern (e.g., approaching the yellow light at a speed above the identified threshold) may be utilized to categorize a future vehicle behavior as high-risk regardless of whether or not the behavior results in an accident. This may enable a more precise count of high-risk behavior at the intersection. Further, driver behavior may be analyzed in real-time or near real-time, and the driver may be given visual, audio, or mechanical feedback (e.g., a vibrating steering wheel) when he or she is engaging in behavior consistent with established patterns of high-risk behavior.

Finally, a user-interface may be provided to a user to enable the user to easily view all of the different types of data (e.g., images/video, vehicle parameters, environment parameters, claim data, etc.) in a chronological manner so that the user can easily understand the context in which a vehicle incident or event occurred.

Returning to FIG. 1, the communication system 100 may generally be divided into front-end components 102 and back-end components 104, both of which may include hardware and software applications, as well as various data communications channels for communicating data between the various hardware and software components. The front-end components 102 may generate or collect road segment data from mobile device sensors, vehicle-mounted sensors, smart infrastructure-mounted sensors, wearable electronics sensors, image sensors, or other sensors (including cameras).

Vehicle sensor data or parameters may provide contextual information of the vehicle 108 (e.g., a car, truck, motorcycle, bicycle), pedestrian, bicyclist, and the like, related to vehicle status (e.g., speed, heading, position, RPM or other tachometer readings, etc.), traffic, vehicle damage, extent of injuries at a vehicle collision, number and identification of vehicles involved, dates and times of vehicle use, duration of vehicle use, mobile device GPS location, lateral and longitudinal acceleration of the vehicle, detected environmental conditions (e.g., detected via LIDAR sensors on the vehicle) such as construction or road conditions, accidents in the area, weather, etc., or other information relating to use of the vehicle 108. Vehicle sensor data or parameters may be collected before, during, and/or after vehicle collisions.

Infrastructure device data or parameters may represent any suitable environment-related data pertaining to a road segment that is collected by an "infrastructure device" including a sensor system external to vehicles at the road segment. The infrastructure device may be mounted to walls, roads, stoplights, stop signs, etc., at the road segment, and may include sensors such as image sensors, motion sensors, radar, microphones, infrastructure status devices (e.g., detecting the status of a stoplight), pressure sensors, temperature sensors, water sensors, light sensors, etc. Infrastructure devices may collect or detect parameters relating to sunshine, precipitation, temperature, humidity, water level, visibility (e.g., impacted by fog or night), infrastructure status, detected motion and/or speed (or lack thereof) at a particular spot, etc.

Finally, image data may represent still images or video of any suitable resolution and frame rate captured by an image sensor (e.g., a camera) disposed at any suitable location (e.g., mounted to walls, roads, stoplights, stop signs, etc., at the road segment). The image data may include images captured in the typical visible light spectrum and/or infrared images.

As noted, the system 100 shown in FIG. 1 may include front-end components 102 coupled to back-end components 104 via a network 130. As used herein and unless otherwise specified, when used in the context of system(s) or device(s) that communicate information or data, the term "network" (e.g., the network 130) refers to a collection of nodes (e.g., devices or systems capable of sending, receiving or forwarding information) and links which are connected to enable telecommunication between the nodes.

Depending on the embodiment (and unless otherwise stated), each of the described networks may include dedicated routers, switches, or hubs responsible for forwarding directing traffic between nodes, and, optionally, dedicated devices responsible for configuring and managing the network. Some or all of the nodes in the described networks may be also adapted to function as routers in order to direct traffic sent between other network devices. Nodes of the described networks may be inter-connected in a wired or wireless manner, and may have different routing and transfer capabilities. If desired, each described network may include networks or sub-networks, such as a personal area network (PAN), a local area network (LAN), or a wide area network (WAN).

Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

A. Exemplary Vehicle and Associated Devices

Front-end components 102 may include an on-board computer 114, a mobile device 110 (e.g., a smart phone, a cellular phone, a tablet computer, a special purpose or general use computing device, smart watch, wearable electronics such as augmented reality appliance, vehicle navigation device, dedicated vehicle monitoring or control device, and the likes), one or more vehicle sensors 120 associated with the vehicle 108, and a communication component 122. The on-board computer 114 may be a general-use on-board computer capable of performing many functions relating to vehicle operation or a dedicated computer for autonomous vehicle operation. Further, the on-board computer 114 may be originally installed by the manufacturer of the vehicle 108, or installed as an aftermarket modification or addition to the vehicle 108.

Examples of the vehicle sensors 120 include a GPS unit, a digital camera, a video camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, and an inductance sensor. Some of the vehicle sensors 120 (e.g., radar, LIDAR, or camera units) may actively or passively scan the vehicle environment for obstacles (e.g., other vehicles, buildings, pedestrians, etc.), roadways, lane markings, signs, or signals. Other sensors 120 (e.g., GPS, accelerometer, or tachometer units) may provide data for determining the location or movement of the vehicle 108. Other sensors 120 may be directed to the interior or passenger compartment of the vehicle 108, such as cameras, microphones, pressure sensors, thermometers, or similar sensors to monitor the vehicle operator and/or passengers within the vehicle 108. Some vehicle sensors 120 may monitor a driver's hand position and/or gaze (either of which may be utilized when developing a risk index for the vehicle and/or when analyzing an insurance claim and assessing fault for an accident). The vehicle sensors 120 may be removably or fixedly incorporated within or connected to the on-board computer 114 or the mobile device 110 and may be disposed in various arrangements.

The on-board computer 114 or mobile device 110 may each be configured to execute one or more algorithms, programs, or applications to generate, collect, or analyze various types of vehicle parameters from the one or more vehicle sensors 120 mounted or installed within the vehicle 108. For instance, in instances when the vehicle 108 is an autonomous vehicle, the on-board computer 114 may collect data related to the autonomous features to assist the vehicle operator in operating the vehicle 108 (e.g., data to facilitate auto-pilot, auto-parking, lane monitoring, adaptive cruise control, etc.). The on-board computer 114 or mobile device 110 may further provide notifications when the driver or vehicle 108 are engaging in risky behavior (an assessment that may be facilitated by way of machine learning algorithm).

In some embodiments, the mobile device 110 may supplement the functions performed by the on-board computer 114 described herein. In other embodiments, the on-board computer 114 may perform all of the functions of the mobile device 110 described herein, in which case no mobile device 110 may be present in the system 100. Additionally, the mobile device 110 and on-board computer 114 may communicate with one another directly over link 116 or indirectly over multiple wireless and/or wired links.

One or more of the applications may allow a user to select destinations and routes along which the vehicle 108 will traverse. One or more of the applications may provide restrictions on vehicle use or store user preferences for vehicle use, such as in a user profile. One or more of the applications may generate and/or display a notification like a virtual navigation map or an alert depicting hazardous areas (e.g., identified by one or more of the systems described herein based upon previously collected claim data or road segment data and/or previously calculated risk scores or indices) for the user to avoid traversing, and allow the user to select one or more alternative travel routes.

The on-board computer 114 or mobile device 110 may also be configured to communicate with the vehicle 108 utilizing a personal area network utilizing any appropriate standard or protocol for near-field communication such as the Bluetooth communication protocol. In some embodiments, the on-board computer 114 or mobile device 110 may communicate with the vehicle 108, such as via a vehicle controller (not shown), or a vehicle telephony, entertainment, navigation, or information system (not shown) of the vehicle 108 that provides functionality other than autonomous (or semi-autonomous) vehicle control.

The communication component 122 may be utilized to transmit and receive information from external sources, including other vehicles, infrastructure, smart home controllers or sensors, or the back-end components 104. To send and receive information, the communication component 122 may include a transmitter and a receiver (or transceiver) designed to operate according to predetermined specifications, such as the dedicated short-range communication (DSRC) channel, wireless telephony, Wi-Fi, or other existing or later-developed wireless communications protocols.

The received information may supplement the data received from the vehicle sensors 120. For example, the communication component 122 may receive information that another vehicle ahead of the vehicle 108 is reducing speed, allowing for adjustments in the operation of the vehicle 108.

In some embodiments, the front-end components 102 may communicate with the back-end components 104, such as the server 140, via a network 130. As such, the back-end components 104 may receive vehicle sensor data or parameters, images or image data, and/or infrastructure device data or parameters that were collected by the front-end components 102. The on-board computer 114 and mobile device 110 may be configured to transmit or receive, via the network 130, road segment data or any other desired data using one or more suitable communication protocols, such as a Wi-Fi direct protocol, an ad-hoc cellular communication protocol, and the like. The network 130 may be a proprietary network, a secure public internet, a virtual private network or some other type of network, such as dedicated access lines, plain ordinary telephone lines, satellite links, cellular data networks, or a combination thereof.

The network 130 may be implemented as a wireless telephony network (e.g., GSM, CDMA, LTE, etc.), a Wi-Fi network (e.g., via one or more IEEE 802.11 Standards), a WiMAX network, a Bluetooth network, and the likes. The network 130 may include one or more radio frequency communication links, such as wireless communication links 112 and 118 with the mobile device 110 and on-board computer 114, respectively. Where the network 130 comprises the Internet, data communications may take place over the network 130 via an Internet communication protocol.

B. Exemplary Image Sensor

In some embodiments, the front-end components 102 may include an image sensor device 119 (sometimes simply "image sensor 119") for capturing images of vehicles, pedestrians, roads, sidewalks, or any other suitable object located at or near a road segment. The image sensor 119 may be disposed on, in, or near the infrastructure component 126. In some instances, the image sensor 119 is mounted or otherwise disposed at any suitable location from which the road segment is viewable.

The image sensor 119 may be any suitable image sensor or camera configured to capture still images or video. The image sensor 119 may be configured to capture images or video in 2D or 3D, and may be configured to capture scenes in the visible light spectrum or in the infrared spectrum.

After capturing one or more images, the image sensor device 119 may transmit the captured images to the server 140 via the network 130 (e.g., via a wireless or wired link). In some instances, the images may be transmitted via the vehicle 108, the component 122, and/or the mobile device 110; in other instances, the images may be transmitted via other nodes (e.g., via a satellite or access point not shown).

C. Exemplary Infrastructure Device

In some embodiments, the front-end components 102 may include an infrastructure communication device 124 (sometimes "infrastructure device") for monitoring environment conditions at a given road segment, including weather conditions, conditions and/or statuses of vehicles or pedestrians near the road segment, conditions and/or statuses of one or more one or more infrastructure components 126, etc.

The "infrastructure component" 126 is an infrastructure item associated with a road segment, and may include bridges, traffic signals, gates, signs, switches, crossings, parking lots or garages, toll booths, docks, hangars, or other similar physical portions of a transportation system's infrastructure.

The infrastructure device 124 may include or be communicatively connected to one or more sensors (not shown) for detecting and receiving information relating to the condition or status associated with (or otherwise relevant to) the infrastructure component 126. For example, when the infrastructure component 126 is a traffic signal, the infrastructure device 124 may detect the operational health of the traffic signal, the status of the lights (e.g., red, yellow, green), etc. In some instances, the infrastructure device 124 may detect information related to the environment in which the component 126 is disposed, such as atmospheric or weather conditions, traffic conditions (detected via a radar detector or motion sensor), etc.

The infrastructure device 124 may be configured to transmit the collected information to the server 140 via the network 130 and may be configured to transmit the collected information to the vehicle 108 via the communication component 122. In some embodiments, the infrastructure communication device 124 may receive information from the vehicle 108. The infrastructure communication device 124 may be configured to monitor the vehicle 108 and/or directly or indirectly communicate information to other vehicles.

D. Exemplary Server and Back-end Components

The server 140 may receive or collect images or road segment parameters (e.g., vehicle parameters or environment parameters) from the front-end components 102 (e.g., from the sensors 119, 120, and 124) via the network 130, store and process the road segment data in the database 146 or program memory 160.

The server 140 may comprise a controller 155 that is operatively connected to the database 146 via a link 156. The controller 155 may also be operatively connected to the network 130 via a link 135. The controller 155 may include a program memory 160, a processor 162, a random-access memory (RAM) 164, and an input/output (I/O) circuit 166, all of which may be interconnected via an address/data bus 165. Similarly, the memory of the controller 155 may include multiple RAMs 164 and multiple program memories 160. The RAM 164 and program memory 160 may be implemented as semiconductor memories, magnetically readable memories, or optically readable memories, for example.

The program memory 160 may store various software applications, which may include a road segment analysis application 143 (sometimes "road segment application 143" or "application 143") and a travel route determination application 144 (sometimes "travel route application 144" or "application 144"). The application 143 may perform a number of functions, as described with respect the methods depicted in FIGS. 3-9.

The travel route determination application 144 may determine and select travel routes that route a vehicle, pedestrian, or bicycle from a starting location to a destination that avoids traversing an area having a high risk score. The applications 143 and 144 may be executed by the processor 162 or by any other suitable processor(s).

In some embodiments, one or more portions of the server 140 may be implemented as one or more storage devices that are physically co-located with server 140, or as one or more storage devices utilizing different storage locations as a shared database structure (e.g., cloud storage). In some embodiments, the server 140 may be configured to perform any suitable portion of the processing functions remotely that have been outsourced by the mobile device 110 or the on-board computer 114. For example, the mobile device 110 may collect images or road segment parameters as described herein, but may send the images or road segment parameters to the server 140 for remote processing by the server 140 instead of processing the images or road segment parameters locally.

In some embodiments, the server 140 may be part of an insurer computing system (or facilitate communications with an insurer computer system), and as such, may access insurer databases as needed to perform insurance-related functions.

Specifically, the server 140 may access "claim data" representing one or more filed insurance claims (e.g., in which a vehicle driver or passenger files an insurance claim claiming a loss associated with an incident that occurred at or near a road segment). Claim data may include multiple claims records, each of which corresponds to a particular claim and each of which may include variables or sets of data descriptive of a corresponding claim. An exemplary claim record may include: a claim ID unique to the filed claim; a policy owner ID unique to the policy holder who filed the claim; a vehicle ID unique to the vehicle owned by the policy holder (e.g., a license plate or VIN number); an area ID unique to the area where the incident or collision occurred (e.g., unique to the road segment); damaged components data identifying the property damage resulting from the incident or property; injury or medical information identifying bodily injury resulting from the incident; a repair or replacement value describing the costs associated with repairing or replacing the damaged components; time and date information unique to the time when the incident or collision occurred; and/or other information, such as data indicating a number and extent of personal injuries resulting from a vehicle collision.

In one embodiment, data received from the mobile device 110 or the on-board computer 114 may include user credentials, which may be verified by the server 140 or one or more other external computing devices or servers. These user credentials may be associated with an insurance profile, which may include, for example, financial account information, insurance policy numbers, a description and/or listing of insured assets, vehicle identification numbers of insured vehicles, addresses of insured users, contact information, premium rates, discounts, and the likes. In this way, data received from the mobile device 110 or the on-board computer 114 may allow the server 140 to uniquely identify each insured customer.

In addition, the server 140 may facilitate the communication of the updated insurance policies, premiums, rates, discounts, and the likes to their insurance customers for their review, modification, and/or approval. In some instances, the server 140 may require user credentials before collecting vehicle sensor data from the vehicle sensors 120. As an example, the data collection process may be part of an opt-in program in which the user explicitly indicates a desire to have vehicle sensor data collected. In some scenarios, the user may be incentivized to opt-in by way of lower insurance premiums.

Although the system 100 is shown to include one vehicle 108, one mobile device 110, one on-board computer 114, and one server 140, it should be understood that additional vehicles 108, mobile devices 110, on-board computers 114, image sensors 119, vehicle sensors 120, infrastructure devices 124, and/or servers 140 may be utilized. For example, the system 100 may include a plurality of servers 140 and hundreds of mobile devices 110 or on-board computers 114, all of which may be interconnected via the network 130. Servers 140 may be dedicated for each of the various types of road segment parameters described above.

Furthermore, the database storage or processing performed by the one or more servers 140 may be distributed among a plurality of servers 140 in a cloud computing arrangement. This configuration may provide various advantages, such as enabling near real-time uploads and downloads of information, as well as periodic uploads and downloads of information. This may in turn support a thin-client embodiment of the mobile device 110 or on-board computer 114 discussed herein.

E. Exemplary Components of the Devices 110, 114, and 140

Figure 2:
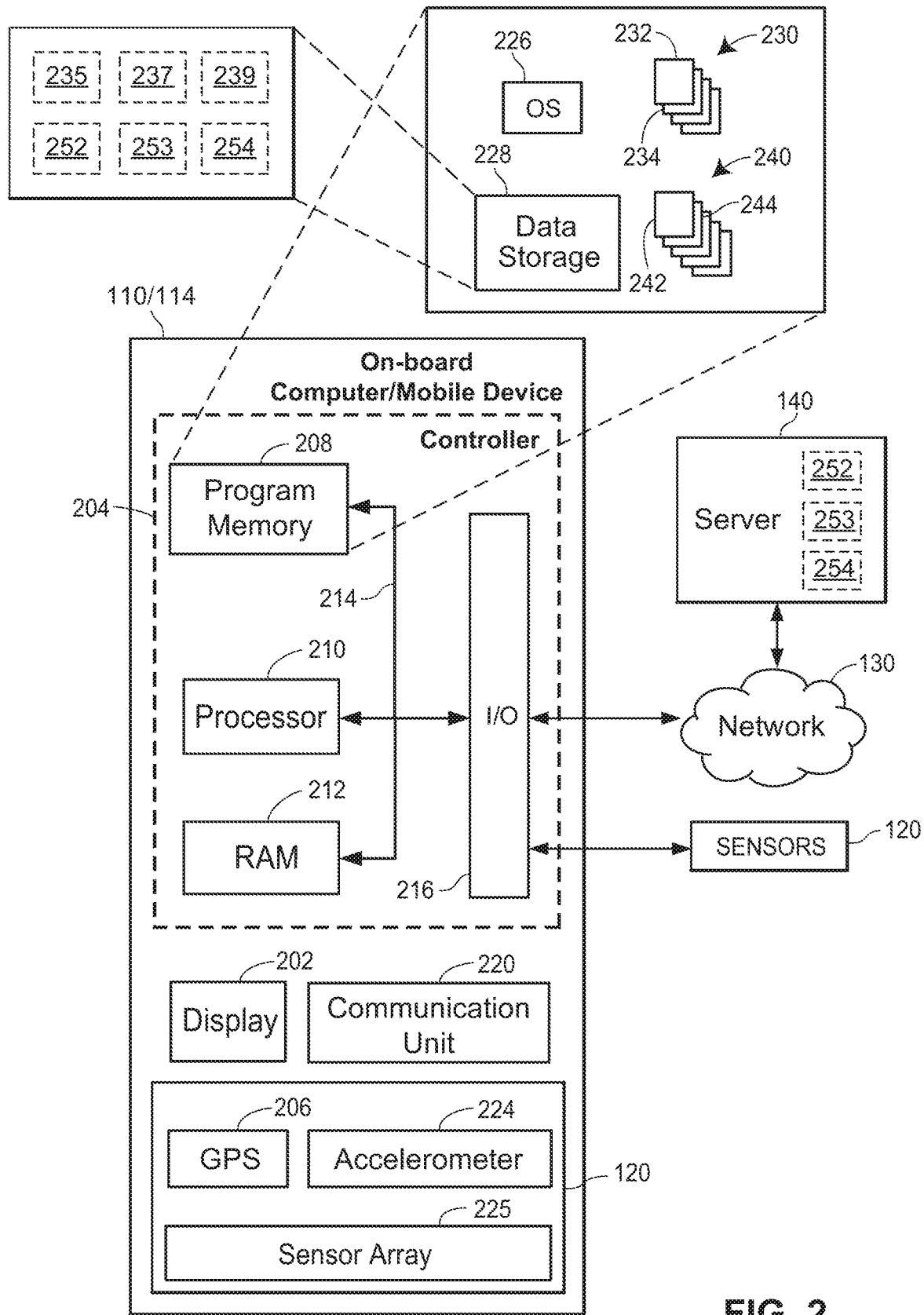
FIG. 2 is a block diagram showing exemplary components of the mobile device, the on-board computer, or the server shown in FIG. 1, according to one embodiment.

FIG. 2 is a block diagram including the mobile device 110 or the on-board computer 114 and the server 140, consistent with the system 100 of FIG. 1.

1. Exemplary Components of the Devices 110 or 114

The mobile device 110 or on-board computer 114 may include a display 202, a controller 204, a GPS unit 206, a communication unit 220, an accelerometer 224, a sensor array 225 (e.g., one or more cameras, accelerometers, gyroscopes, magnetometers, barometers, thermometers, proximity sensors, light sensors, Hall Effect sensors, radar units) and one or more user-input devices (not shown), such as a keyboard, mouse, microphone, or any other suitable user-input device. The communication unit 220 may provide input signals to the controller 204 via the I/O circuit 216, and may also transmit sensor data, device status information, control signals, or other output from the controller 204 to one or more external sensors within the vehicle 108 or server 140. The one or more sensors of the sensor array 225 may be positioned to determine telematics data regarding the speed, force, heading, and/or direction associated with movements of the vehicle 108. In some embodiments, the mobile device 110 or on-board computer 114 may be integrated into a single device, and in other embodiments, may be separate devices.

Similar to the controller 155 of FIG. 1, the controller 204 may include a program memory 208, one or more processors 210 (e.g., microcontrollers or microprocessors), a RAM 212, and the I/O circuit 216, all of which are interconnected via an address/data bus 214. The program memory 208 may include an operating system 226, a data storage 228, a plurality of software applications and/or routines 230 or 240. The operating system 226, for example, may include one of a plurality of general purpose or mobile platforms, such as the Android™, iOS®, or Windows® operating systems. Alternatively, the operating system 226 may be a custom operating system designed for vehicle operation using the on-board computer 114.

The data storage 228 may include data such as user profiles and preferences, application data for the plurality of applications or routines 230 or 240, and other data related to road navigation and/or vehicle operation features. In some embodiments, the controller 204 may also include, or otherwise be communicatively connected to, other data storage mechanisms (not shown), such as hard disk drives, optical storage drives, or solid-state storage devices located within the vehicle 108.

As discussed with reference to the controller 155, it should be appreciated that although FIG. 2 depicts only one processor 210, the controller 204 may include multiple processors 210. The processor 210 may be configured to execute any of one or more of the pluralities of software applications or routines 230 or 240 residing in the program memory 208, in addition to other software applications. Similarly, the controller 204 may include multiple RAMs 212 and multiple program memories 208. RAM 212 and program memory 208 may be semiconductor memories, magnetically readable memories, or optically readable memories, for example.

As discussed with reference to the program memory 160 in FIG. 1, the data storage 228 may store various software applications or routines 230/240 implemented as machine-readable instructions, which may include a road segment analysis application 232 and a travel route determination application 234 (similar to the applications 143 and 144 described with reference to FIG. 1). Further, the data storage 228 may store a model 242, which the device 110/114 may develop utilizing machine-learning (ML) methods and which the device 110/114 may utilize to predict a level of risk a driver assumes (e.g., represented by a risk index or risk score) when engaging in a particular behavior (e.g., accelerating through a yellow light) or driving through a particular road segment.

The model 242 may be trained based upon training data including road segment data and/or data representing previously observed vehicle events at a road segment and/or any incidents or accidents that may or may not have resulted from such events. After training, the model 242 may then be utilized to assign a risk score to events that can be characterized by various types of road segment data (e.g., vehicle telematics data, infrastructure data, image data, etc.). In some instances, the device 110/114 may develop and utilize additional models 244 similar to the model 242. For example, the device 110/114 may develop and utilize a road segment model (e.g., a model 244) for each of a plurality of road segments (e.g., wherein each is predictive of risk assumed at a particular road segment based upon input factors such as vehicle traffic and behavior, time of day, day of week, season, weather conditions, road conditions, pedestrian traffic and behavior, etc.) and/or a vehicle model for each of a plurality of types of vehicles (e.g., wherein each is predictive of risk assumed for a particular driver, vehicle, vehicle type/category [e.g., based upon size, model, etc.] or some combination thereof based upon input factors such as road segment, vehicle/driver behavior, time of day, day of week, season, weather conditions, road conditions, pedestrian traffic and behavior, etc.).

2. Exemplary Data Stored at the Devices 110 or 114

In addition to applications and routines, the data storage 228 may store various data, such as risk index and/or risk score data 235 (sometimes abbreviated to "risk index data 235") representing calculated risk levels associated with certain vehicle events or road segments; travel route data 237 that may be utilized to provide route recommendations to a driver of the vehicle 108 (e.g., sometimes based at least in part on the calculated risk indices or scores 235), and/or notification data 239 representing notifications to be provided to a user in the vehicle 108 (e.g., regarding travel routes, risk scores, risk indices, etc.).

In one embodiment, the data storage 228 may include one or more of road segment parameters 252 (e.g., derived from the vehicle sensors 120, the infrastructure devices 124, and/or the image sensor(s) 119), images 253 (e.g., derived from the image sensor(s) 119), and/or claim data 254 (e.g., derived from servers or databases storing records of filed auto insurance claims). In some embodiments, the road segment parameters 252, images 253, and/or claim data 254 may be stored in the database 146 managed by server 140.

The data 235-239 and 252-253 is described in further detail below with respect to the computer-implemented methods shown in FIGS. 3-8.

II. Exemplary Methods to Facilitate Analyzing Road Segments

The description below references FIGS. 3-8 and 10 and describes various computer-implemented methods 300-800 and 1000 that may be implemented by the system 100 via the devices 110 or 114. The computer-implemented methods 300-800 and 1000 may be implemented, in whole or in part, by the system(s) shown in FIGS. 1 and 2 and/or via one or more local or remote processors, servers, transceivers, and/or sensors, and may be saved to a memory as one or more instructions or routines. With that said, while various aspects of the system 100 may be referenced below in describing example operations (e.g., the computer 110/114, the server 114, the image sensors 119, the vehicle sensors 120, the infrastructure device 124, the processor 210 of the computer 110/114, the model 242, etc.), it will be understood that any suitable set of vehicle sensors, image sensors, infrastructure devices, processors, computers, and servers may implement the described operations depending on the embodiment.

A. Exemplary Computer-Implemented Method for Synchronizing Data from Vehicle Sensors with Data from Infrastructure Devices.

Figure 3:
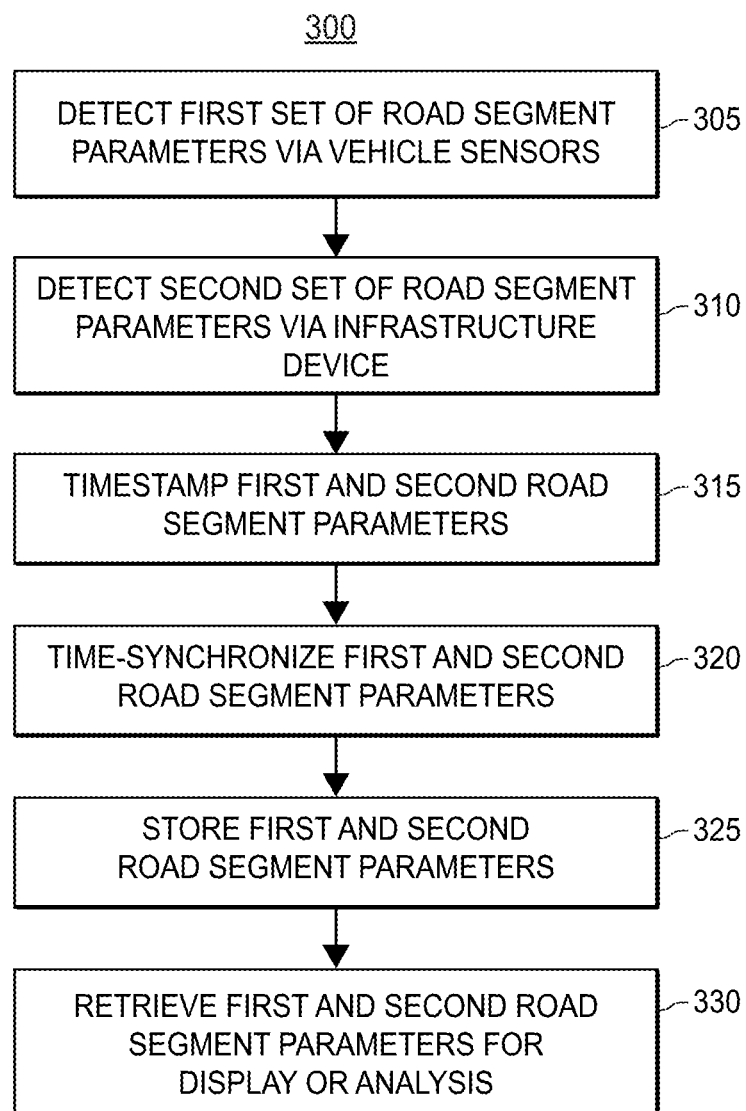
FIG. 3 is a flow chart of an exemplary computer-implemented method for synchronizing data from vehicle sensors with data from infrastructure devices, according to one embodiment.

FIG. 3 depicts an exemplary computer-implemented method 300 for synchronizing data from vehicle sensors with data from infrastructure devices. The method 300 may, via one or more local or remote processors, servers, transceivers, and/or sensors, enable enhanced and contextualized analysis or review of vehicle events by way of synchronizing different data types, relating to a monitored road segment, collected via various different types of data sources. For example, the method 300 enables a user of the system 100 to (i) view vehicle sensor data relating to the status or condition of a particular vehicle and its observable environment and (ii) simultaneously view infrastructure device data relating to the status or condition of an infrastructure component or any other desired environmental or atmospheric condition existing at the road segment at the moment in time (and vice versa).

At a step 305, the system 100 detects a first set of road segment parameters represented by data collected via the one or more vehicle sensors 120. The first set of road segment parameters may represent any desired parameter that may be collected or identified from information detected or collected via the vehicle sensors 120, such as speed, heading, acceleration, turn angle, or any other desired parameter associated with the vehicle 108 or the driver of the vehicle 108.

At a step 310, the system 100 detects a second set of road segment parameters represented by data collected via the one or more infrastructure devices 124. The second set of parameters may represent any desired parameter that may be collected or identified from information detected or collected via the infrastructure device(s) 124, such as a traffic signal status.

At a step 315, the system 100 timestamps the detected road segment parameters within the first and second sets. Notably, the first and second sets may be timestamped according to clocks associated with the devices that detected or collected them, and those clocks may not necessarily be synchronized with one another. For example, a vehicle sensor 120 may detect a speed parameter of the vehicle 108 while the vehicle is running a red light and may record the relevant timestamp according to a first clock associated with the vehicle sensor 120 (e.g., indicating the speed was detected/collected at a time 4:28:23 PM).

At the same time, the infrastructure device 124 may detect a status of the relevant traffic signal and may timestamp a corresponding parameter according to a second clock associated with the infrastructure device 124. However, the timestamp associated with the traffic signal may be slightly off due to the first and second clocks not being synchronized (e.g., the second timestamp may indicate a time of 4:28:04 PM). Thus, in some circumstances, it may be desirable to synchronize the first and second sets of parameters such that a given event reflected in both sets of parameters (e.g., the point at which the traffic signal turned red) will have timestamps consistent with each other.

At a step 320, the system 100 time-synchronizes all of the road segment parameters within the first and second sets of parameters such that they reference a common clock and are in agreement with respect to a time at which a given event may have occurred (e.g., which may be reflected by parameters within both the first and second sets). This may involve identifying one or more events detectable by both the vehicle sensors and the infrastructure device. As an example, each of the one or more vehicle sensors and the one or more infrastructure devices may include a microphone. A distinct sound may be emitted (e.g., organically within the environment or purposefully by the system 100) and detected by both the vehicle sensor 120 and the infrastructure device 124. The collected parameters subsequently may be synchronized using this commonly detected sound as a reference point (e.g., in which it is agreed that that the sound occurred at time XX:YY:ZZ).

At a step 325, the first and second sets of road segment may be stored to a memory, such as the memory 160 or the database 146.

At a step 330, the system 100 may (i) display (e.g., via any suitable display coupled to the mobile device 110, the computer 114, the server 140, or a client coordinating with the server 140 [not shown]) the first and second sets of road segment parameters via a user interface according to a chronological order determined based upon the set of timestamps with which the plurality of road segment parameters have been timestamped, or (ii) analyze the first and second sets of road segment parameters to identify one or more vehicle events, each characterized by a subset of the plurality of road segment parameters.

Figure 9:
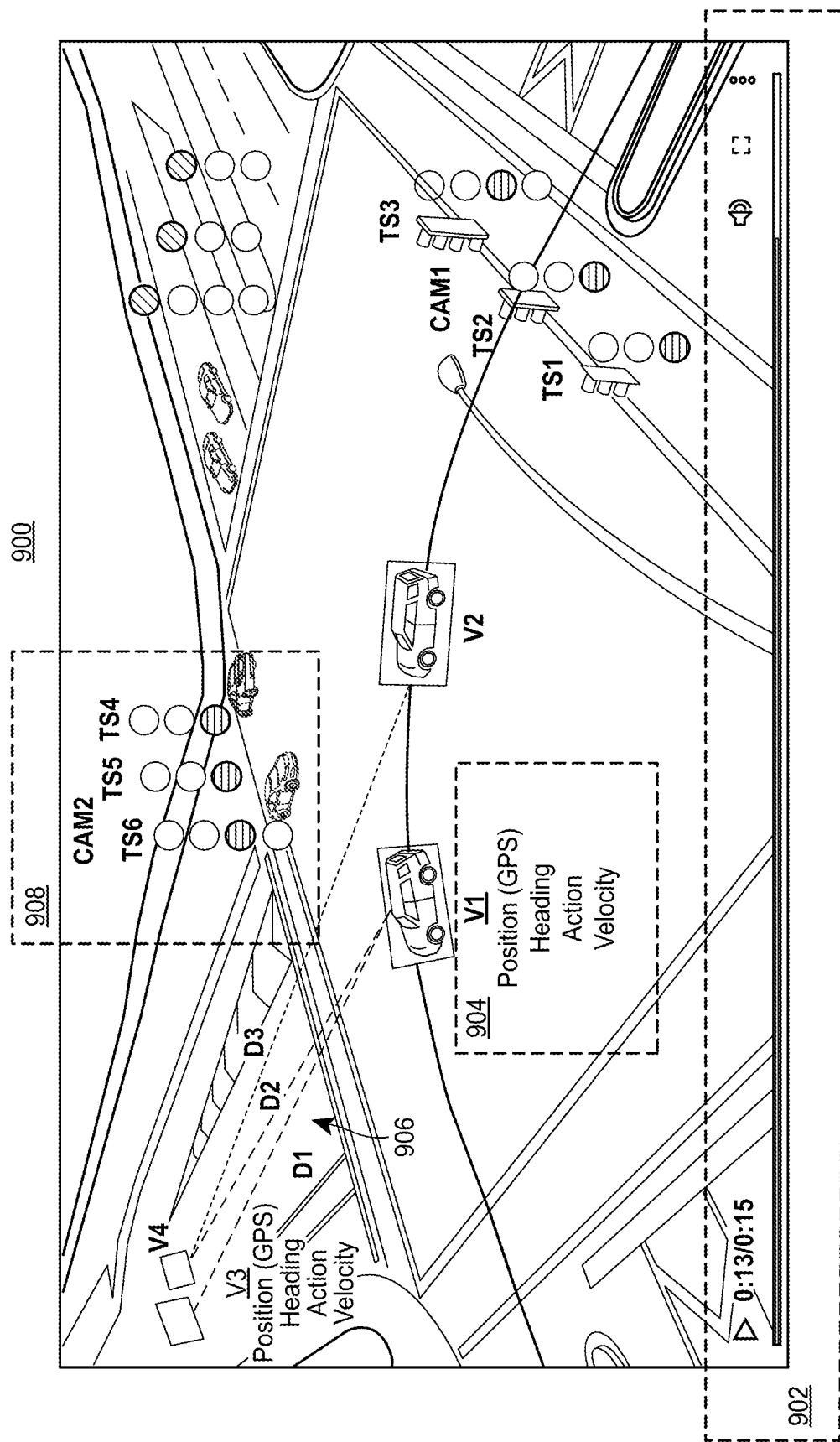
FIG. 9 depicts an exemplary graphical user interface (GUI) for analyzing events at a road segment, which may be provided when implementing the computer-implemented method shown in FIG. 8, according to one embodiment.

An exemplary user interface that may be used to display the parameters is shown in, and described with respect to, FIG. 9.

As noted, the first and second set of parameters may be analyzed to identify a subset of parameters representing a vehicle event. As an example, a set of parameters from the vehicle sensors (e.g., speed, heading, brake status, steering wheel orientation, etc.) and a set of parameters from an infrastructure device (e.g., a traffic signal status, a radar gun, a motion sensor, etc.) may each correspond to a vehicle driving through an intersection (e.g., while speeding, while running a red light, while driving through a yellow light, before/during/after being involved in an accident with another vehicle, etc.).

Exemplary vehicle events may include single vehicle accidents (e.g., caused by driving while intoxicated or distracted driving), accidents involving multiple vehicles, accidents involving pedestrians and/or vehicles, one or more vehicles exceeding a speed limit, one or more vehicles driving through a red light or a stop sign, one or more vehicles being involved in a "near-miss" (i.e., an incident in which an accident was narrowly avoided), or one or more vehicles simply driving through a road segment in question. The method 300 may include additional, less, or alternate actions, including those discussed elsewhere herein.

Figure 4:
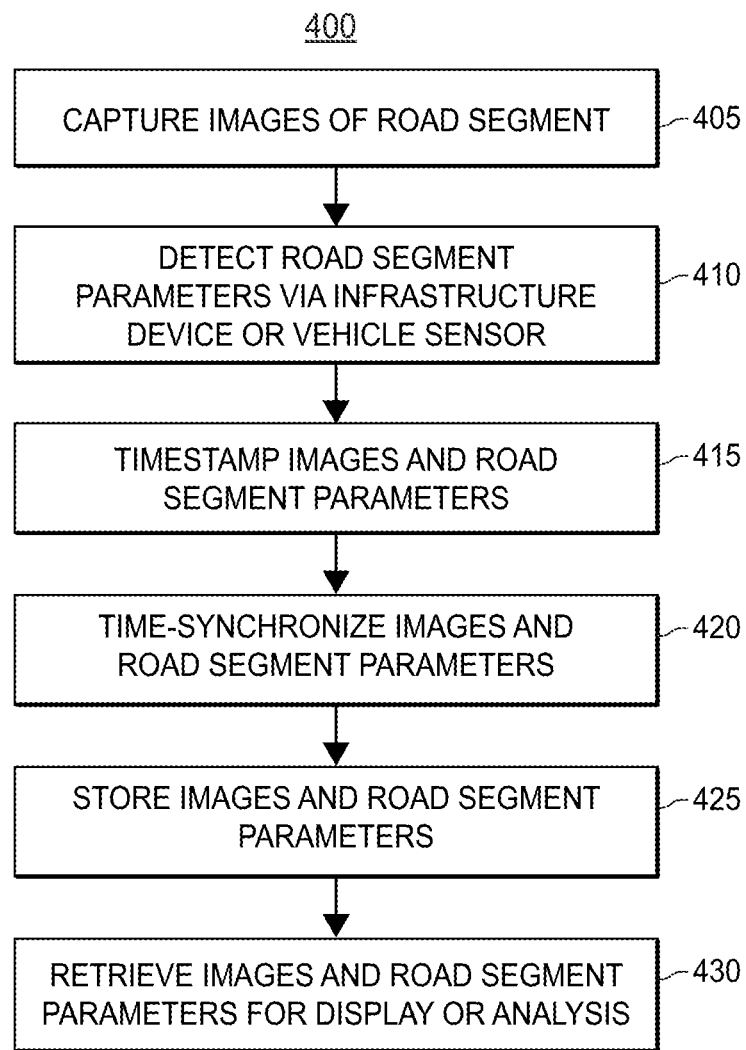
FIG. 4 is a flow chart of an exemplary computer-implemented method for synchronizing road segment data with image data, according to one embodiment.

B. Exemplary Computer-Implemented Method for Synchronizing Road Segment Data with Image Data FIG. 4 depicts an exemplary computer-implemented method 400 for synchronizing road segment data with image data. The method 400 may, via one or more local or remote processors, servers, transceivers, and/or sensors, enable enhanced and contextualized analysis or review of vehicle events by way of synchronizing different data types, relating to a monitored road segment, collected via various different types of data sources. For example, the method 400 enables a user of the system 100 to (i) view images or videos of the road segment captured at a particular moment in time and (ii) simultaneously view road segment data captured via a vehicle sensor or infrastructure device at the same moment in time (e.g., enabling the user to better understand the behavior of vehicles at the road segment and the environment conditions of the road segment at that time).

At a step 405, the system 100 captures images of a road segment via the image sensor 119 shown in FIG. 1. The captured image may be a single still image (e.g., captured in response to a detected event, such as detected motion), a still image that is part of a series of images, or an image that is part of a video. The image sensor 119 may be part of any suitable camera mounted at any suitable location near the road segment. As an example, the image sensor 119 may be mounted on a traffic signal system, a telephone poll, a wall of a nearby building, etc. In some instances, the image sensor 119 may be disposed within a vehicle driving through or near the relevant road segment.

At a step 410, the system 100 detects a plurality of road segment parameters identified via data collected by either the vehicle sensors 120 or the infrastructure device 124.

At steps 415, 420, and 425, the system 100 timestamps, time-synchronizes, and stores the collected images and road segment parameters in a manner similar to that described with reference to FIG. 3. That is, the collected images and road segment parameters are synchronized such that timestamps associated with the images and road segment parameters are in agreement with respect to a time or time period during which an event, reflected in both the images and road segment parameters, occurred.

Similarly, at a step 430, the system 100 retrieves the images and/or road segment parameters for display or analysis in a manner similar to the described with reference to the step 330 shown in FIG. 3.

For example, the system 100 may display a user interface in which a user is able to select an image or portion of a video to display. Because the images or video are timestamped, the system 100 can analyze road segment parameters stored to memory that are associated with the same road segment and that have a timestamp corresponding to the timestamp of the currently displayed video or image. The system 100 may then display relevant-in-time road segment parameters corresponding to the date/time depicted in the displayed image or video. Thus, the system 100 enables a user to better contextualize an image or video he is seeing on screen by way of showing him corresponding road segment parameters (or vice versa). The method 400 may include additional, less, or alternate actions, including those discussed elsewhere herein.

Figure 5:
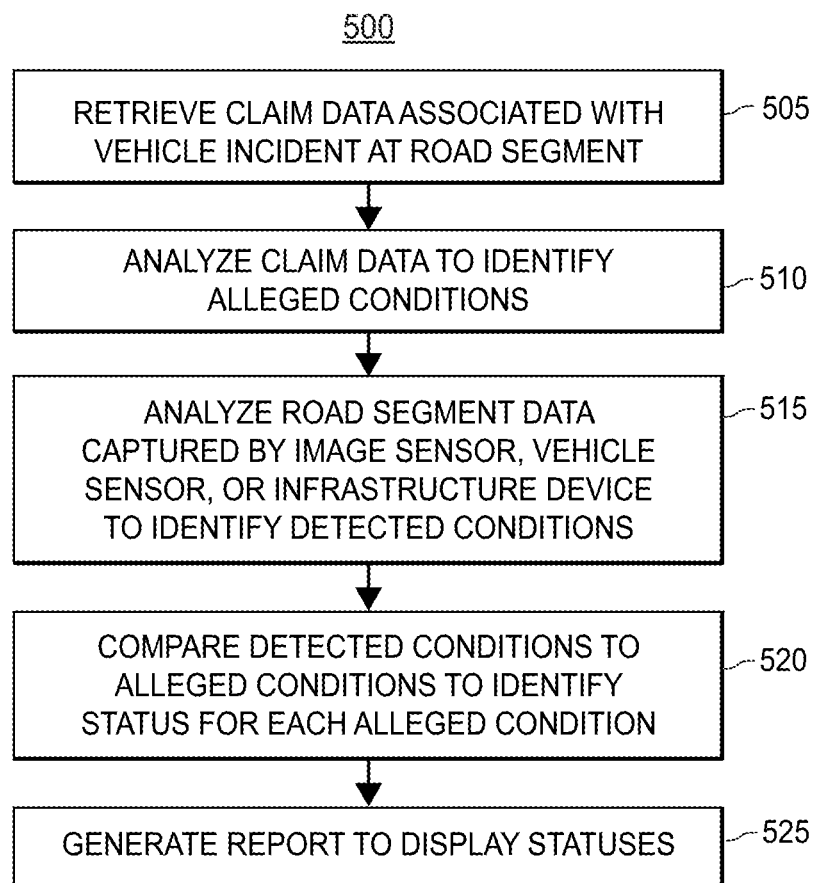
FIG. 5 is a flow chart of an exemplary computer-implemented method for analyzing claim data using road segment data, according to one embodiment.

C. Exemplary Computer-Implemented Method for Analyzing Claim Data Using Road Segment Data FIG. 5 depicts an exemplary computer-implemented method 500 for analyzing claim data using road segment data. Advantageously, the method 500 may, via one or more local or remote processors, servers, transceivers, and/or sensors, enable a user of the system 100 to develop a comprehensive understanding of one or more vehicle events that may have occurred at a road segment. For example, he may view not only images or video captured at the time of a vehicle incident in question (e.g., related to a filed insurance claim); he may also view relevant parameters descriptive of involved vehicles (e.g., to help him understand the speeds, headings, positions, braking status, etc., of one or more vehicles of interest at a given point in time). This may be especially relevant for a user attempting to assign fault to a vehicle accident when analyzing a filed insurance claim.

At a step 505, the system 100 retrieves claim data (e.g., from the memory 160 or the database 146 shown in FIG. 1) representing an insurance claim associated with a vehicle incident at a road segment.

The "claim data" may be stored as the claim data 254 shown in FIG. 2. Generally speaking, the claim data 254 is data associated with filed insurance claims arising from real world vehicle collisions. In some instances, the data may be scrubbed of personal information, or otherwise de-identified auto insurance claim data. Claim data 254 generally represents insurance claims filed by insurance policy owners. The claim data 254 may identify a particular collision, policy owners, involved vehicles, a location where the collision occurred, property involved, repair and/or replacement costs and/or estimates, a time and date of the collision, and/or various other information.

In one embodiment, actual claim images (such as mobile device images of damaged vehicles, or images acquired via vehicle-mounted cameras and/or sensors) may be analyzed to associate an amount of physical damage shown in one or more images of vehicles involved in a vehicle collision with a repair or replacement cost of the vehicles. The actual claim images may be used to estimate repair or replacement cost for vehicles involved in past, recent, or current vehicle collisions.

The above-mentioned "vehicle incident" may be any suitable vehicle incident that led to or was otherwise associated with an insurance claim. For example, a vehicle may have been involved in a collision with another vehicle, with a pedestrian, with an obstacle on or near the road segment (e.g., construction equipment, a telephone pole, a sign, etc.). Generally speaking, the vehicle incident involves an alleged loss of some sort (e.g., a bodily injury, damage to a vehicle, damage to some other property, etc.).

At a step 510, the system 100 analyzes the claim data to identify one or more conditions alleged (e.g., by the insured) to have existed at the time of the vehicle incident. Alleged conditions may relate to atmospheric conditions (e.g., weather conditions, lighting conditions, etc.), traffic conditions (e.g., the presence and/or state of other vehicles at the road segment), vehicle conditions for one or more vehicles involved (e.g., alleged speeds, headings, positions, etc.), infrastructure component conditions (e.g., a traffic light state, such as green, yellow, or red), etc. Additionally, the claim data may indicate a time-period during which the incident occurred; a loss alleged to have resulted from the vehicle incident. Notably, any one or more of these types of conditions may be reflected by road segment data collected by the system 100.

At a step 515, the system 100 analyzes road segment data or parameters (e.g., data or parameters identified via image sensor the 119, the vehicle sensor(s) 120, and/or the infrastructure device(s) 124 to detect one or more conditions actually in existence during the relevant time-period according to the captured data from the devices 119, 120, and/or 124.

At a step 520, the system 100 compares the detected conditions to the alleged conditions. For each alleged condition, the system 100 may generate a status. The status may be a binary variable (e.g., true/false), a ternary variable (e.g., true/false/inconclusive), an integer/float/long variable indicating a probability that the alleged condition existed or a degree to which the alleged condition is supported by the detected conditions (e.g., if it was alleged that a traffic signal turned red before a vehicle crossed a threshold, the status variable may have a value of 45, indicating there is a 45% chance the allegation is true), or any desired type of variable capable if indicating a degree to which an alleged condition existed.

At a step 525, the system 100 displays the one or more statuses for the one or more alleged conditions. These conditions may be displayed within a user interface such as that shown in FIG. 9 (described in relation to FIG. 9 below). The method 500 may include additional, less, or alternate actions, including that discussed elsewhere herein.

Figure 6:
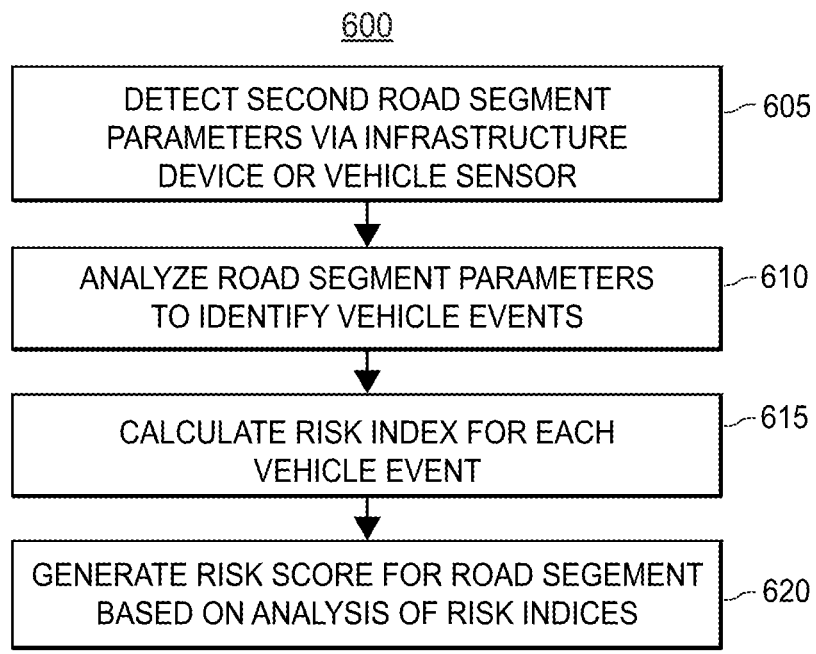
FIG. 6 is a flow chart of an exemplary computer-implemented method for estimating degrees of risk associated with road segments based upon road segment, according to one embodiment.

D. Exemplary Computer-Implemented Method for Estimating Degrees of Risk Associated with Road Segments Based Upon Road Segment Data FIG. 6 depicts an exemplary computer-implemented method 600 for estimating degrees of risk associated with road segments based upon road segment data. The method 600 may, via one or more local or remote processors, servers, transceivers, and/or sensors, enable enhanced route navigation configured to avoid risky road segments. The risk assessment performed via the method 600 may be based upon patterns and correlations observed from historical road segment data (e.g., vehicle telematics data, infrastructure data, image data, etc.). For example, in an embodiment, the method 600 may be implemented via the system 100 and the model 242 shown in FIGS. 1 and 2. The method 600 may enable users to identify risky driving behavior that is not intuitive (e.g., it may be the case that slowly approaching a yellow light at a speed below a certain threshold raises the driver's risk profile).

At a step 605, the system 100 detects road segment data or parameters via the infrastructure device(s) 124 and/or the vehicle sensors 120 in a manner similar to that previously discussed.

At a step 610, the system 100 analyzes the detected road segment parameters to identify one or more vehicle events (e.g., such as those described with reference to FIG. 3).

At a step 615, the system 100 calculates a risk index for each identified vehicle event (e.g., using model 242 after it has been trained on road segment data including vehicle telematics data, infrastructure data, images, etc.). Generally speaking, the system 100 calculates a risk index for a vehicle event by categorizing the vehicle event. The system 100 analyzes numerous historical vehicle events that are similarly categorized and analyzes vehicle accidents that occurred or did not occur in conjunction with the historical vehicle events. Based upon the type, severity, and frequency of accidents having occurred in conjunction with a given category of vehicle event, the system 100 (e.g., via the model 242) assigns a "risk index." The accident data may be derived from claim data. This may be a score from 0-100, for example, in which a "0" is very low risk and a "100" is very high risk.

At a step 620, the system 100 generates a risk score for the road segment based upon an analysis of the calculated risk indices associated with the vehicle events. This "risk score" for the road segment may be thought of as a comprehensive risk assessment for the road segment that is based upon an analysis of a representative number of vehicle events occurring at the road segment during a given time period.

As an example, the system 100 may analyze a number of vehicles approaching an intersection before/during/after a traffic signal turns yellow (each approach may be categorized as a "vehicle event"). The system 100 may analyze various images and road segment parameters to assign a risk index to each approach (each approach may be thought of as a discrete vehicle event). For vehicles that significantly accelerate when the light turns yellow (or late into the yellow late), the system 100 may assign a relatively high risk index to the event. For an approach in which a vehicle more slowly approaches the yellow light, a lower risk index may be assigned. The system 100 then analyzes the risk indices to calculate a risk score representing a median or average of the risk indices. The risk score may help engineers identify high risk intersections. This may be useful because certain structural factors may be contributing to drivers consistently making high-risk decisions (e.g., the traffic signal may be programmed to have a yellow light that is too long or too short; drivers may be surprised by the light if it is positioned shortly after a turn or hill peak; etc.). Depending on the situation, some of these structural factors may be remedied, resulting in safer intersections.

As another example, a road segment may include a one-way bridge with one end that terminates on the slope of a hill near the hill's peak. In other words, the bridge may be positioned such that it is not visible until the vehicle crests the hill, thus giving the driver limited time to slow down if he or she was not already aware of the bridge. In such a scenario, one might expect the road segment data to reflect that vehicles consistently approach the bridge at a higher than safe speed (e.g., each such approach may represent a vehicle event which the system 100 has assigned a relatively high-risk index). Thus, the system 100 may assign each of these high speed approaches a relatively high risk index and may subsequently calculate a relatively high risk score for the road segment.

In some instances, the system 100 may execute a risk index notification routine to provide to a driver an indication of calculated risk index associated with a currently active vehicle event. For example, a driver may exhibit signals of distracted driving (e.g., gazing away from the road) or operate the vehicle in a manner that the system 100 identifies as high risk (e.g., aggressively accelerating, turn, or otherwise maneuvering the vehicle) and that the system thus assigns a high risk index. The system 100 may then generate and display an indicator to the driver notifying him of the risk index, thus giving the driver dynamic feedback regarding his or her risky behavior. The indicator may be displayed or verbalized within the vehicle 108 (e.g., via a mounted screen, a mobile device screen, etc.) as a raw score (e.g., on a scale of 0-100) or as a some other icon or indicator, which may be color-coded according to the risk index (e.g., wherein green represents relatively low risk and red represents relatively high risk).

In some instances, the system 100 may execute a risk score mapping routine to generate, for example, a virtual navigation map or alert to depict one or more risk scores for areas or road segments within a depicted region, by performing one or more of the following operations: (i) identifying a region; (ii) identifying one or more risk scores associated with road segments within the region; and/or (iii) generating a virtual navigation map or alert that may include or is overlaid with elements (e.g., graphic, audible, haptic) depicting the identified risk scores along with the areas.

First, the system 100 may identify a region. This may be responsive to user input received via one or more input devices coupled to the I/O 216 shown in FIG. 2. For example, a user may specify a particular zip code or city. In some embodiments, the user may specify a particular area (e.g., a landmark, intersection, building, parking lot, address, and the likes) and a radius.

Second, the system 100 may identify one or more risk scores associated with areas within the region. For example, if the user specified a zip code of 60606, the system 100 may identify risk scores associated with road segments within zip code 60606. As noted, each of these risk scores may be calculated based upon an analysis of vehicle events at the road segment in question. For example, each vehicle event at a road segment over a given period of time may be analyzed and assigned a risk index, indicating the relative riskiness of each vehicle event; and a risk score may be calculated based upon these risk indices. As a result, the risk score for a road segment may be thought of as a comprehensive indicator of the degree to which high or low risk vehicle events might be expected at a given road segment.

Third, the system 100 may generate a virtual navigation map or alert that may include or that is overlaid with elements corresponding to the identified risk scores. Each element may indicate a risk score associated with an area or road segment. For example, certain colors, shapes, or sizes of graphic elements may indicate risky or hazardous road segments. A road segment with a high risk score may be encompassed by a large, red circle, for example, while a road segment with a low risk score may be encompassed by a smaller, blue circle. Various other shapes or symbols may be utilized to indicate risk scores (e.g., triangles, hexagons, exclamation points, and the likes). In some embodiments, graphic elements may be names that are, e.g., colored or sized to correlate to the risk index. For example, the graphic elements may be street names (e.g., "Broadway") or intersection names (e.g., "Broadway and Main").

In some embodiments, a graphic element may be a depiction of a road segment itself, colored or sized to correlated to the risk score. For example, if the intersection of Broadway and Main has a high risk score, the graphic element may be a depiction of Broadway and Main (e.g., graphics of the intersecting streets), colored red and/or enlarged, for example. If the intersection of Broadway and Main has a low risk score, the graphic element may be a depiction of Broadway and Main, colored blue and shrunk relative to a normal size, for example.

The system 100 may store the virtual navigation map to the data storage 228 as the notification data 239 shown in FIG. 2. In some embodiments, the system 100 may display the virtual navigation map via the display 202. The virtual navigation map may be depicted as a heat map, using various colors, for example, to indicate different levels of risk.

A user may rely on the displayed virtual navigation map to evaluate the risk of various areas. For example, a driver or potential driver may rely on the virtual navigation map to choose less risky travel routes. In some instances, a civil engineer may rely on the virtual navigation map to identify areas that potentially need infrastructure improvement. For example, a high-risk area may need additional stop lights or street lights to reduce the number and/or severity of collisions at the area. The method 600 may include additional, less, or alternate actions, including that discussed elsewhere herein.

Figure 7:
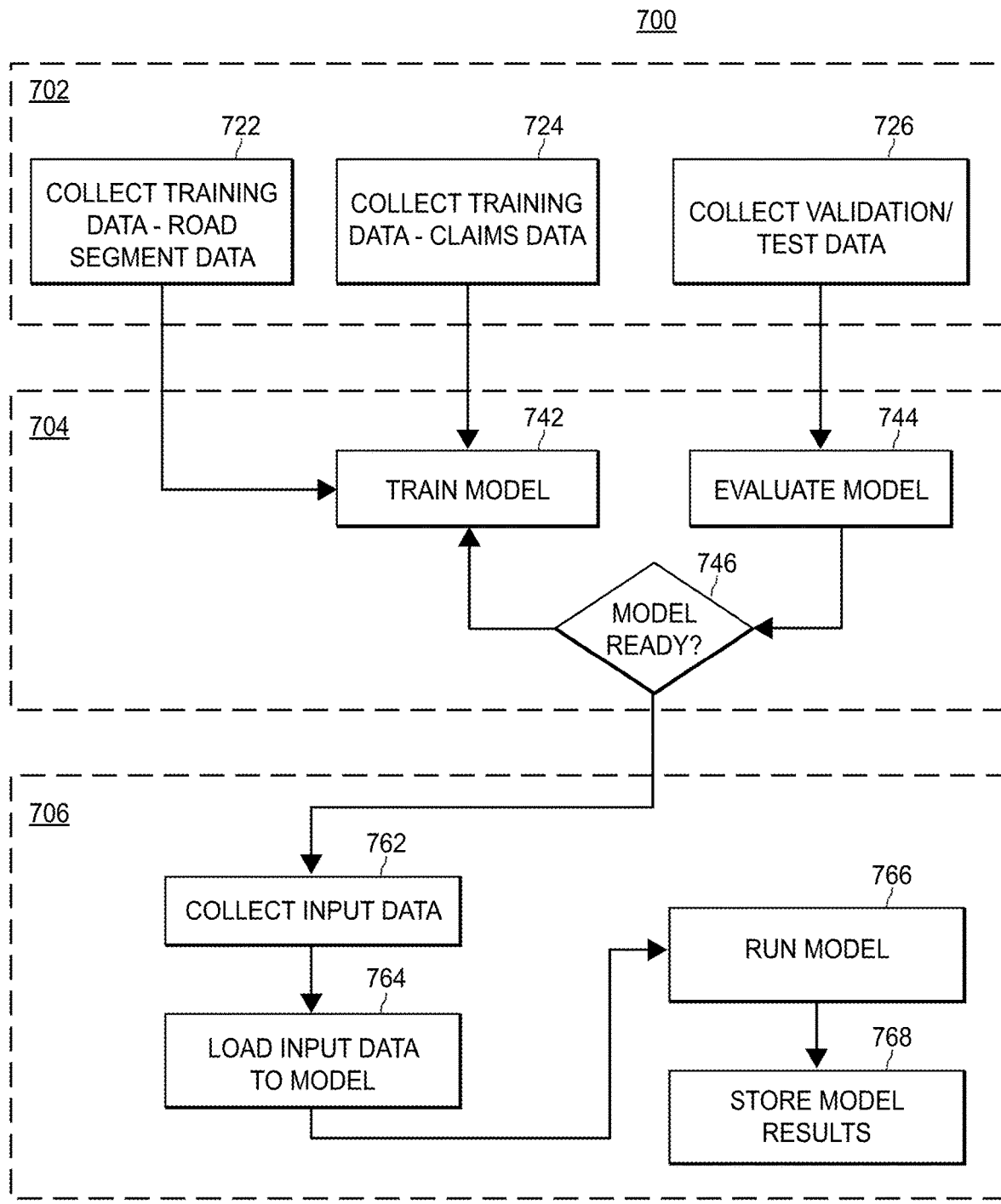
FIG. 7 is a flow chart of an exemplary computer-implemented method for training, evaluating and utilizing a machine learning (ML) model, such as the model shown in FIG. 2, for predicting a level of risk exposure based upon previously observed relationships between various vehicle events and corresponding vehicle incidents (e.g., crashes), according to one embodiment.

E. Exemplary Computer-Implemented Method for Implementing a Machine Learning Model to Predict Risk Exposure Associated with Behaviors FIG. 7 depicts an exemplary computer-implemented method 700 for training, evaluating and utilizing a Machine Learning (ML) model, such as the model 242 shown in FIG. 2, for predicting a level of risk exposure based upon previously observed relationships between various vehicle events and corresponding vehicle incidents (e.g., crashes). The method 700 may be implemented via one or more local or remote processors, servers, transceivers, and/or sensors. At a high level, the method 700 includes a step 702 for model design and preparation, a step 704 for model training and evaluation, and a step 706 for model deployment.

Generally speaking, machine learning refers to methods of data analysis that automate analytical model building. Specifically, machine learning generally refers to the algorithms and models that computer systems use to effectively perform a specific task without using explicit instructions, relying on patterns and inference instead. While traditional programs may be thought of as producing a set of outputs based upon specifically designed logic (e.g., embodied by the routines or instructions of the program) to produce a set of outputs, the process of developing machine-learning models may be thought of as producing logic based upon observed relationships between inputs and corresponding known outputs.

Machine learning algorithms learn through a process called induction or inductive learning. Induction is a reasoning process that makes generalizations (a model) from specific information (training data—i.e., data including inputs and corresponding known outputs). Generalization is required because the model that is prepared by a machine-learning algorithm, such as the model 242 shown in FIG. 2, needs to make predictions or decisions based upon specific data instances that were not seen during training (i.e., instances including inputs without corresponding known outputs).

Depending on the implementation, the system 100 may implement supervised learning, unsupervised learning, or semi-supervised learning when developing the model 242. Supervised learning is a learning process for generalizing on problems where a prediction is required. A "teaching process" compares predictions by the model to known answers (labeled data) and makes corrections in the model. In such an embodiment, the driving data may be labeled according to a risk level (e.g., depending on the nature and severity of swerving, braking, observed driver distraction, proximity to other vehicles, rates of acceleration, etc.). Unsupervised learning is a learning process for generalizing the underlying structure or distribution in unlabeled data.

In one embodiment utilizing unsupervised learning, the system may rely on unlabeled impairment data, unlabeled driving data, or some combination thereof. During unsupervised learning, natural structures are identified and exploited for relating instances to each other. Semi-supervised learning can use a mixture of supervised and unsupervised techniques. This learning process discovers and learns the structure in the input variables, where typically some of the input data is labeled, and most is unlabeled. The training operations discussed herein may rely on any one or more of supervised, unsupervised, or semi-supervised learning with regard to the impairment data and driving data, depending on the embodiment.

1. Machine Learning Model Preparation

The step 702 may include any one or more steps or sub-steps 724-728, which may be implemented in any suitable order. At the steps 722 and 724, the system 100 receives one or more first training data sets indicative of driving patterns (e.g., represented by vehicle events) and corresponding vehicle incidents (or lack thereof) for training the selected model.

In some embodiments, the one or more sets of the first training data may be collected from any suitable device capable of observing relevant data or parameters, such as the vehicle sensors 120, the infrastructure device(s) 124, and/or the image sensor(s) 119. In short, the training data may characterize various driving events (e.g., vehicle position, heading, speed, etc.) as well as any vehicle incidents (e.g., car crashes) resulting from the vehicle event. The vehicle incidents may be identified from the data collected by the devices 120, 119, or 125; or may be identified from insurance claim data representing one or more insurance claims filed based upon a vehicle incident associated with the relevant vehicle event.

At the step 726, the system 100 receives test/validation data for testing the model 242. In short, the test data is utilized to verify that the developed model 242 is capable of generating reliable predictions.

2. Machine Learning Model Training

The system 100 may develop the ML model 242 (sometimes simply called the "model 242") at the step 704, which may include any one or more steps or sub-steps 742-746. In a typical example, at the step 742, the system 100 trains the model 242 using the training data sets described above. At the step 744, the system 100 evaluates the developed model 242, and at the step 746, the system 100 determines whether or not the developed model 242 is ready for deployment before either proceeding to step 706 or returning to step 742 to further develop, test, or validate the model 242.

Regarding the sub-step 742 of the step 704, developing the model 242 typically involves the system 100 training the model 242 using training data. At a high level, machine-learning models are often utilized to discover relationships between various observable features (e.g., between predictor features and target features that are theoretically predictable based upon the predictor features) in a training dataset.

After "learning" these relationships, the system 100 may develop a representative formula or algorithm characterizing the relationships. This formula or algorithm may then be applied to an input dataset to predict unknown values for one or more target features (e.g., values representing a likelihood of an accident or an assumed risk) given the known values for the predictor features (e.g., values representing vehicle events characterized by position, heading, speed, relationship to traffic signs/signals, relationship to other vehicles/pedestrians/objects; etc.).

Regarding the sub-step 744 of the step 704, evaluating the model 242 typically involves testing or validating the model 242 using testing/validation data. Testing/validation data typically includes both predictor feature values and target feature values, enabling comparison of target feature values predicted by the model to the actual target feature values, enabling one to evaluate the performance of the model. This testing/validation process is valuable because the model, when implemented, will generate target feature values for future input data that may not be easily checked or validated.

Thus, it is advantageous to check one or more accuracy metrics of the model on data for which the target answer is already known (e.g., testing data or validation data), and use this assessment as a proxy for predictive accuracy on future data. Exemplary accuracy metrics include key performance indicators, comparisons between historical trends and predictions of results, cross-validation with subject matter experts, comparisons between predicted results and actual results, etc.

Regarding the sub-step 746 of the step 704, the system 100 may utilize any suitable set of metrics to determine whether or not to proceed to the step 706 for model deployment. Generally speaking, the decision to proceed to the step 706 or to return to the step 742 will depend on one or more accuracy metrics generated during evaluation (the step 744). After the sub-steps 742-746 of the step 704 have been completed, the system 100 may implement the step 706.

3. Machine Learning Model Implementation

The step 706 may include any one or more steps or sub-steps 762-768, which may be implemented in any suitable order. In a typical example, the system 100 collects input data (step 762), loads the input data into the model 242 (step 764), runs the model 242 with the input data (step 766), and stores results generated from running the model 242 to memory (e.g., the memory 208) (step 768).

Note, the method 700 may be implemented in any desired order and may be at least partially iterative. That is, the step 702 may be implemented after the step 704 or after the step 706 (e.g., to collect new data for training, testing, or validation), and the step 704 may be implemented after the step 706 (e.g., to further improve the model via training or other development after deployment). The method 700 may include additional, less, or alternate actions, including that discussed elsewhere herein.

Figure 8:
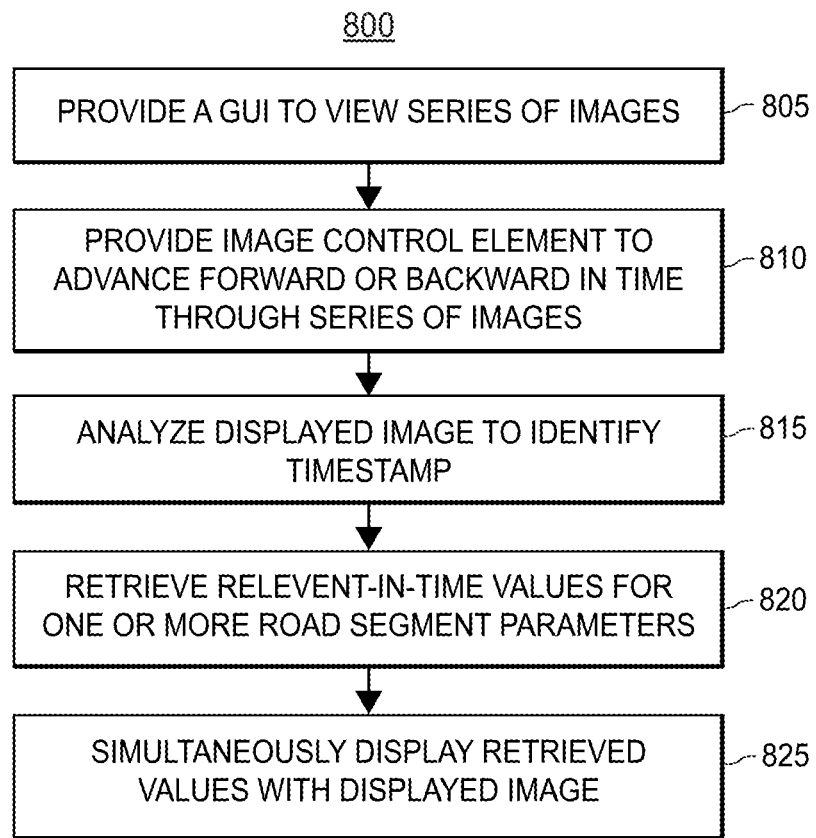
FIG. 8 is an exemplary computer-implemented method for providing a user interface to facilitate analyzing vehicle events at a road segment, according to one embodiment.

F. Exemplary Computer-Implemented Method for Providing a User Interface to Analyze Events at a Road Segment FIG. 8 depicts an exemplary computer-implemented method 800 for providing a user interface to facilitate analyzing vehicle events at a road segment. Advantageously, the method 800 may, via one or more local or remote processors, servers, transceivers, and/or sensors, enable a user to better contextual images/video, vehicle sensor data, and/or infrastructure device data. That is, rather than viewing each of these three types of data in isolation, a user may view information from all three data sources based upon a given time of interest.

At a step 805, the system 100 displays a graphic user interface (GUI) configured to display at least one of a series of images. Generally speaking, the GUI is generated via a routine and enables a user to interact with indicators and other graphic elements displayed on an electronic display (e.g., of the device 110/114/140/etc.). Further, the graphic elements of a GUI may be output elements (i.e., conveying some sort of information to the user), control elements (i.e., being user "interactable" to cause the execution of an action by the system), or both (e.g., an icon may include an image representing a browser and may be interacted with to launch the browser).

Exemplary GUI control elements include buttons (e.g., radio buttons, check boxes, etc.), sliders, list boxes, spinner elements, drop-down lists, menus, menu bars, toolbars, interactive icons, text boxes, windows that can be moved or minimized and maximized, etc. The GUI displayed by the system 100 may include one or more control elements for controlling the time or time-period of interest, which may cause GUI to display road segment parameters or images, representing conditions in existence at the time or time-period of interest, derived from image data, vehicle sensor data, and/or infrastructure device data.

At a step 810, the system 100 displays, within the user interface, an image control element interactable to advance forward or backward in time through the series of images.

At a step 815, the system 100 analyzes an image displayed within the user interface to identify a timestamp associated with the image.

At a step 820, the system 100 retrieves a relevant-in-time value for a road segment parameter based upon the timestamp identified in the step 815. The road segment parameter may be derived from data captured via image sensor(s), vehicle sensor(s), infrastructure device(s), or some combination thereof. In some instances, a displayed road segment parameter is directly captured by one of the aforementioned systems (e.g., a detected speed).

In other instances, a displayed road segment parameter may be derived from data received from one or more of the aforementioned systems. For example, the previously displayed risk indices (typically assigned to a vehicle event) may be displayed next to a vehicle as the vehicle drives through a road segment, and may dynamically change as the driver's behavior changes (e.g., as the driver's behavior becomes more or less risky). Similarly, a risk score that has been calculated for a road segment may be displayed within the user interface.

In some instances, vehicle or driver behavior may be characterized in other manners not directly determinable from any single sensor or system. The system 100 may determine from a number of data sources that a user is attempting to "beat" a yellow light. For example, the system 100 may detect an increase in speed based upon a vehicle sensor 120 configured to detect speed and may determine this increase in speed corresponded to a traffic signal turning yellow (e.g., detected by the system 100 via an infrastructure device 124). Accordingly, the system 100 may label this behavior (e.g., stored as a variable value to memory) and may subsequently display the label, or a corresponding graphic/audible indication, to indicate the behavior to a user.

At a step 825, the system 100 displays the retrieved value for the road segment parameter while simultaneously displaying the image. As a result, the system 100 provides a user with contextual information relevant-in-time to the image or video displayed within the user interface. The method 800 may include additional, less, or alternate actions, including those discussed elsewhere herein.

Figure 10:
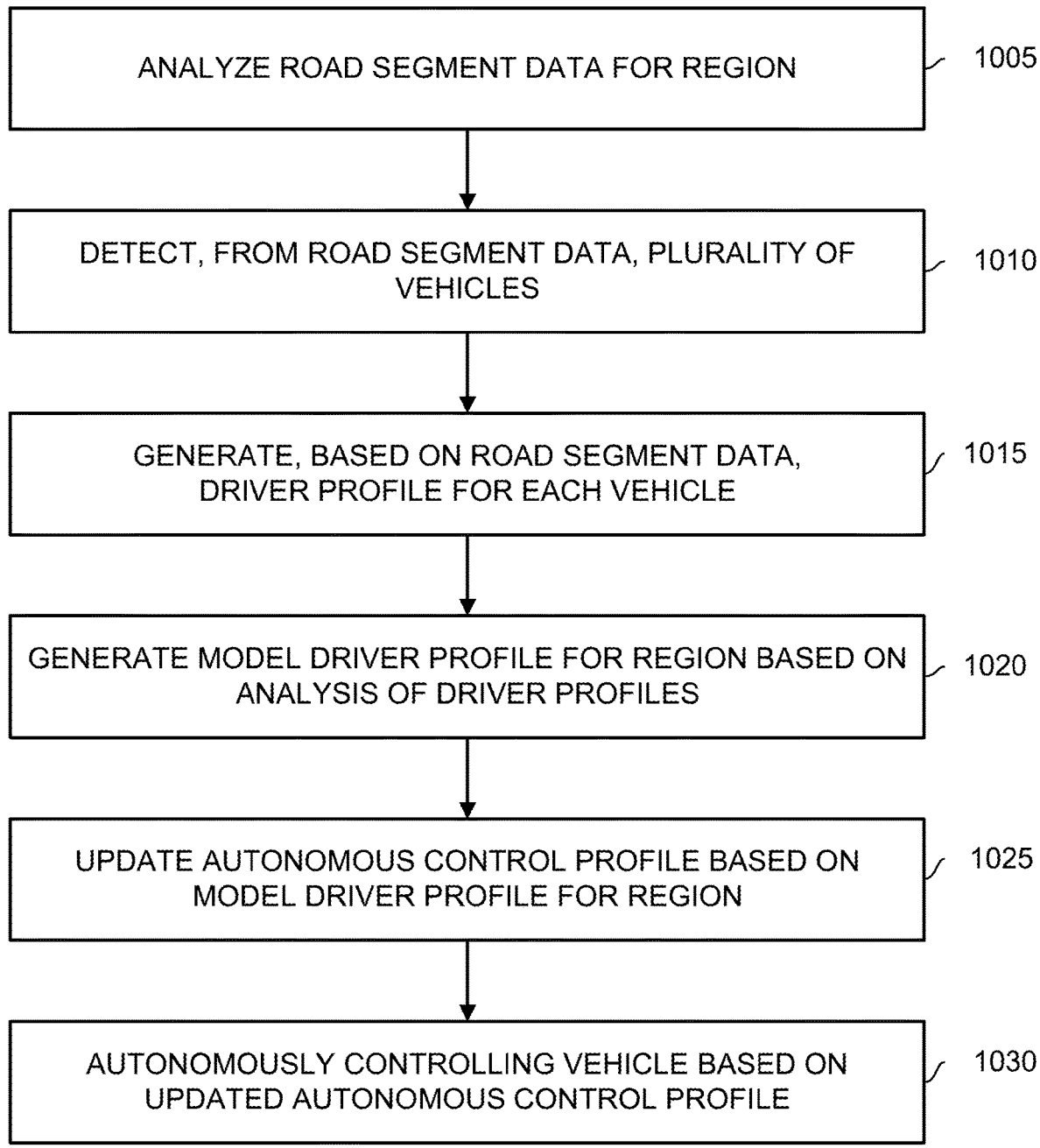
FIG. 10 depicts an exemplary computer-implemented method for developing and implementing model driver profiles based upon road segment data.

G. Exemplary Computer-Implemented Method for Developing and Implementing Model Driver Profiles Based Upon Road Segment Data FIG. 10 depicts an exemplary computer-implemented method 1000 for developing and implementing a model driver profile based upon road segment data. The method 1000 may, via one or more local or remote processors, servers, transceivers, and/or sensors, enable enhanced autonomous control of vehicles that accounts for region-specific tendencies of drivers. The model driver profile developed via the method 1000 may be developed based upon patterns and correlations observed from historical road segment data (e.g., vehicle telematics data, infrastructure data, image data, etc.). For example, in an embodiment, the method 1000 may be implemented via the system 100 and the model 242 shown in FIGS. 1 and 2.

As used herein, an "autonomous control system" is a control system configured to operate a vehicle (e.g., an automobile, a motorcycle, etc.) without a user's input. For example, an autonomous control system may accelerate the vehicle, brake the vehicle, turn the vehicle, change gears of the vehicle, activate or deactivate lights of the vehicle, etc., without input from the user. The autonomous control may be carried out in response to environmental conditions (e.g., detected road conditions, detected center lines and side lines, detected proximate vehicles and other objects, etc.) and in response to internal settings (e.g., indicating aggressiveness for certain behaviors relating to cornering, acceleration, braking, etc.; indicating distance maintained from other vehicles; etc.). In some embodiments, an autonomous control system may be fully autonomous (e.g., wherein a user simply enters a destination and the vehicle drivers to the destination) or may be partially autonomous (e.g., an adaptive cruise control system, an automatic parking system, etc.).

At a step 1005, the system 100 analyzes road segment data particular to a given region (e.g., a city, a neighborhood, a zip code, an area code, etc.).

At a step 1010, the system 100 detects, from the analyzed road segment data, a plurality of vehicles. For example, at a given intersection, the system 100 may detect (e.g., based on an analysis of infrastructure data, vehicle telematics data, etc.) 500 cars that passed through the intersection during a given time period (e.g., a 2 hour period). The system 100 may similarly analyze road segment data at any desired number of road segments within the region of interest to detect vehicles.

At a step 1015, the system 100 generates a driver profile for each vehicle detected at the step 1010. Generally speaking, a driver profile is a set of parameters or scores, for a driver or vehicle, pertaining to an evaluation of a risk evaluation for the driver or vehicle. Example parameters or scores include: a metric relating to distance maintained from other vehicles; a metric relating to typical or average speeds; a metric relating to hard braking; a metric relating to frequency of vehicle incidences or crashes; a metric relating to eye gaze; etc. In some instances, the driver profile may be a single risk score, representing a comprehensive assessment of a driver's engagement in safe vs risky behavior. For example, a driver risk score may be a value between 0-100, wherein 0 is the "safest" possible score and 100 is the "riskiest" possible score. Any desired scale may be used for such a driver risk score (e.g., a binary scale wherein 0 is "safe" and 1 is "risky;" 0-5; 0-10; etc.). If desired, driver risk scores may include or otherwise account for risk indices for any identified vehicle events in which the vehicle in question was involved. Each driver profile generated by the system 100 may be stored to a memory such as the memory 160 shown in FIG. 1.

At a step 1020, the system 100 generates a model driver profile for the region based on an analysis of the driver profiles generated in the step 1015. Generally speaking the model driver profile represents a representative driver or vehicle in the region and not any particular actual driver. The model driver profile may include the same parameters, scores, or metrics included in the driver profiles generated in step 1015. The model driver profile generated by the system 100 may be stored to a memory such as the memory 160 shown in FIG. 1. Likewise, any desired number of region-specific driver model profiles may be stored to a memory such as the memory 160.

At a step 1025, the system 100 updates an autonomous control profile for a vehicle based on the model driver profile for the region. Generally speaking, an "autonomous control profile" represents a set of parameter values or settings that may be utilized by an autonomous control system to autonomously control a vehicle. Example settings or parameter values that may be included in the described autonomous profile include settings relating to distance maintained from vehicles, aggressiveness when cornering or braking, minimum or maximum speed thresholds relative to speed limits, etc. The controlled vehicle may be a vehicle similar to the vehicle 108 shown in FIG. 1, and may include any one or more of the same features or components described with respect to the vehicle 108.

At a step 1030, the autonomous control system of the vehicle autonomously controls the vehicle based on the updated autonomous control profile. One or more of the settings of the autonomous control system (e.g., those updated at the step 1025) may be particular to the region associated with the model driver profile. Thus, the autonomous control system may be thought of as having region-specific settings that can be activated when the control system detects the vehicle entering or approaching the region, thereby enabling precise control of the vehicle that is responsive to typical or expected drivers and driving conditions in the region.

In some instances, particular settings may be specific to not only region, but also to a time period (e.g., season, month, day of the week, time of day, etc.), environmental conditions (e.g., detected rain, snow, ice, sleet, low visibility, etc.), user preferences (e.g., relating to aggressiveness), etc.

III. Exemplary GUI for Analyzing Events at a Road Segment

FIG. 9 depicts an exemplary GUI 900 for analyzing events at a road segment. The system 100 may provide the GUI 900 in response to implementing the method 800 shown in FIG. 8. Advantageously, the GUI 900 enables a user to simultaneously view (i) images or video of a road segment captured at a particular moment in time by one or more image sensors (e.g., by the image sensor 119 shown in FIG. 1), (ii) road segment data or parameters captured by one or more vehicle sensors at the particular moment in time (e.g., by the vehicle sensor 120 shown in FIG. 1), (iii) road segment data or parameters captured by one or more infrastructure devices at the particular moment in time (e.g., by the infrastructure device 124 shown in FIG. 1), and/or (iv) any desired parameter derived from any one or more of the described data/parameters (e.g., risk indices, risk scores, identified behaviors, etc.). Thus, rather than viewing each of these three types of data in isolation, a user may view information from all three data sources based upon a given time or time-period of interest.

The GUI 900 may include an image control element 902, one or more fields 904 for displaying road segment parameter values, one or more indicators 906 for indicating distance between vehicles, and/or one or more indicators 908 for displaying road segment parameter values.

The image control element 902 enables a user to control the image or video displayed within the user interface 900. For example, the element 902 may include a "play" or "advance" button that causes the interface 900 to play a video or advance forward in time through a series of images.

The element 902 may include other sub-elements for controlling the display of images or video, such as a pause button, a stop button, skip forward/backward button, a replay button that causes the interface 900 to replay the last 10 seconds of video (or to replay any desired amount of video), a button for controlling the size of the image/video player (e.g., to cause a full-screen display), a button for controlling the audio level, etc.

The fields 904 may display any desired set of parameters pertaining to a vehicle, and one or more vehicles shown in the interface 900 may have its own set of fields 904 for displaying parameter variables pertaining to that particular vehicle. The fields may include parameters or data collected via vehicle sensors 120, but may also include parameters or data collected via infrastructure devices (e.g., a speed detected by a radar gun) or parameters calculated by the system 100 (e.g., a risk index).

The indicators 906 may display a distance between vehicles. The system 100 may calculate this distance based upon a position determined for each vehicle. The position may be determined from vehicle sensors on-board the vehicles (e.g., via GPS systems of the relevant vehicle or via GPS systems of a mobile device in the vehicle), from an analysis of images captured via the image sensor 109 (e.g., which may account for a known position of the image sensor which is mounted in a known location), from an analysis of data collected via one or more infrastructure devices, etc.

The indicators 908 may display an indication of an operational status of an infrastructure component, such as a traffic signal (e.g., detected via the infrastructure device 124). Specifically, the indicators 908 may indicate the color of light provided at a traffic signal at any given time. Using this information, a user can view the status of the traffic signal (which may not be obvious from images or video alone, due to poor angles, low resolution, long distances between the image sensor and traffic signal, etc.) while analyzing a vehicle event in question. For example, a user may step forward through images or videos of a vehicle going through an intersection to determine whether or not a user ran a red light. The GUI 900 may include additional, less, or alternate functionality, including that discussed elsewhere herein.

IV. Additional Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting.

For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Referencing the methods 300-800 specifically, the described functions may be implemented, in whole or in part, by the devices, circuits, or routines of the system 100 shown in FIG. 1. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the phrase "wherein the system includes at least one of X, Y, or Z" means the system includes an X, a Y, a Z, or some combination thereof. Similarly, the phrase "wherein the component is configured for X, Y, or Z" means the component is configured for X, configured for Y, configured for Z, or configured for some combination of X, Y, and Z.

In addition, use of "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

Throughout this specification, some of the following terms and phrases are used.

Communication Link. Unless otherwise stated, a "communication link" or a "link" is a pathway or medium connecting two or more nodes. A link may be a physical link or a logical link. A physical link is the interface or medium(s) over which information is transferred, and may be wired or wireless in nature. Example physicals links include (i) wired links such as cables with a conductor for transmission of electrical energy or a fiber optic connection for transmission of light and (ii) wireless links such as wireless electromagnetic signals that carry information via changes made to one or more properties of electromagnetic waves.

As noted, a wireless link may be a wireless electromagnetic signal that carries information via changes made to one or more properties of an electromagnetic wave(s). A wireless electromagnetic signal may be a microwave or radio wave and may be referred to as a radio frequency or "RF" signal. Unless otherwise stated, described wireless or RF signals may oscillated at a frequency within any one or more bands found in the spectrum of roughly 30 kHz to 3,000 GHz (e.g., an 802.11 signal in the 2.4 GHz band). Example RF bands include the low frequency ("LF") band at 30-300 kHz, the medium frequency ("MF") band at 300-3,000 kHz, the high frequency ("HF") band at 3-30 MHz, the very high frequency ("VHF") band at 30-300 MHz, the ultra-high frequency ("UHF") band at 300-3,000 MHz, the super high frequency ("SHF") band at 3-30 GHz, the extremely high frequency ("SHF") band at 30-300 GHz, and the tremendously high frequency ("THF") band at 300-3,000 GHz.

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

Computer. Generally speaking, a computer or computing device is a programmable machine having two principal characteristics. Namely, it responds to a set of instructions in a well-defined manner and can execute a prerecorded list of instructions (e.g., a program or routine). A "computer" according to the present disclosure is a device with a processor and a memory. For purposes of this disclosure, examples of a computer include a server host, a personal computer, (e.g., desktop computer, laptop computer, netbook), a mobile communications device (such as a mobile "smart" phone), and devices providing functionality through internal components or connection to an external computer, server, or global communications network (such as the Internet) to take direction from or engage in processes which are then delivered to other system components.

Database. Generally speaking, a "database" is an organized collection of data, generally stored and accessed electronically from a computer system. Generally, any suitable datastore may be referred to as a "database." This disclosure may describe one or more databases for storing information relating to aspects of the disclosure. The information stored on a database can, for example, be related to a private subscriber, a content provider, a host, a security provider, etc. A server (which may or may not be hosted on the same computer as the database) may act as an intermediary between the database and a client by providing data from the database to the client or enabling the client to write data to the database. One of ordinary skill in the art appreciates any reference to "a database" may refer to multiple databases, each of which may be linked to one another.

Display Device. Generally speaking, the terms "display device" or "display" refer to an electronic visual display device that provides visual output in the form of images, text, or video. In some embodiments, the described display devices (e.g., the display 202 shown in FIG. 2) may be any display, screen, monitor, or projector suitable for displaying visual output (e.g., images or video output). Example displays include LED screens, LCD screens, CRT screens, projectors, heads up displays, smart watch displays, headset displays (e.g., VR goggles), etc.

Input/Output (I/O) Interface. Generally speaking, an I/O interface of a computer system is a hardware component (e.g., an I/O controller installed on a motherboard) that communicatively connects one or more processors of the computer system to one or more input or output devices such as UI device or peripheral devices. The I/O interface may receive input and output requests from a system processor, and may then send device-specific control signals to controlled devices based upon the requests. The I/O interface may also receive data, requests, or commands from connected devices that are then transmitted to system processors. I/O interfaces are sometimes called device controllers. The software on a system that interacts with a device controller and that enables the device controller to control or otherwise communicate with a particular device is generally referred to as a "device driver."

Memory and Computer-Readable Media. Generally speaking, as used herein the phrase "memory" or "memory device" refers to a system or device including computer-readable media or medium ("CRM"). "CRM" refers to a medium or media accessible by the relevant computing system for placing, keeping, or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Message. When used in the context of communication networks, the term "message" refers to a unit of communication, represented by a set of data, transmitted or received by a node (e.g., via a link). The set of data representing the message may include a payload (i.e., the content intended to be delivered) and protocol overhead. The overhead may include routing information and metadata pertaining to the protocol or payload (e.g., identifying the protocol for the message, the intended recipient node, the originating node, the size of the message or payload, data integrity information for checking the integrity of the message, etc.). In some instances, a packet or sequence of packets may be thought of as a message.

Processor. The various operations of example methods described herein may be performed, at least partially, by one or more described or implicitly disclosed controllers or processors (e.g., the processors 162 and 210 shown in FIGS. 1 and 2). Generally speaking, the terms "processor" and "microprocessor" are used interchangeably, each referring to a computer processor configured to fetch and execute instructions stored to memory.

By executing these instructions, the disclosed processor (s) can carry out various operations or functions defined by the instructions. The disclosed processor(s) may be temporarily configured (e.g., by instructions or software) or permanently configured to perform the relevant operations or functions (e.g., a processor for an Application Specific Integrated Circuit, or ASIC), depending on the particular embodiment. Each disclosed processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. For example, when a single processor is described as performing a set of operations, it is understood that multiple processors may perform the set of operations in some embodiments according to any desired distribution across the multiple processors. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Routine. Unless otherwise noted, a "routine," "module," or "application" described in this disclosure refers to a set of computer-readable instructions that may be stored on a CRM. Generally, a CRM stores computer-readable code ("code") representing or corresponding to the instructions, and the code is adapted to be executed by a processor to facilitate the functions described as being represented by or associated with the routine or application. Each routine or application may be implemented via a stand-alone executable file, a suite or bundle of executable files, one or more non-executable files utilized by an executable file or program, or some combination thereof. In some instances, unless otherwise stated, one or more of the described routines may be hard-coded into one or more EPROMs, EEPROMs, application specific integrated circuits (ASICs), field programmable gate arrays (FPGAs), or any other hardware or firmware elements.

Further, unless otherwise stated, each routine or application may be embodied as: (i) a stand-alone software program, (ii) a module or sub-module of a software program, (iii) a routine or sub-routine of a software program, or (iv) a resource invoked or accessed by a software program via a "call" to thereby cause the system to implement the task or function associated with the resource.

Server. Generally speaking, a "server" is a program or set of routines that manages network resources or services to provide functionality for other programs or devices called "clients." Servers are typically hosted by a host computer, and this host computer may itself be referred to as a "server." Example servers include database servers, file servers, mail servers, print servers, web servers, game servers, and application servers. Servers may be dedicated (e.g., wherein the software and hardware are used exclusively or nearly exclusively for server functions) or virtual (e.g., wherein the server is hosted by a virtual machine on a physical machine and/or wherein the server shares hardware or software resources of a single machine with another operating system).

The concepts described below should be appreciated when reading parts of this disclosure concerning the insurance industry.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to smart vehicle functionality, or even smart home functionality, or insured assets before (or after) an insurance-related event, including those events discussed elsewhere herein. In return, risk averse insureds, vehicle or home owners, or vehicle occupants may receive discounts or insurance cost savings related to auto, home, personal articles, personal mobility, and other types of insurance from the insurance provider.

In one aspect, smart or interconnected vehicle data, or other data, including the types of data discussed elsewhere herein, may be collected or received by an insurance provider remote server, such as via direct or indirect wireless communication or data transmission from a smart vehicle controller or processor, autonomous or semi-autonomous vehicle controller or processor, smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior or technology that mitigates or prevents risk to (i) insured assets, such as vehicles, or even homes or personal belongings, or (ii) vehicle drivers or occupants.

While the present invention has been described with reference to specific examples, which are intended to be illustrative only and not to be limiting of the invention, it will be apparent to those of ordinary skill in the art that changes, certain additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible.

What is claimed is:

1. A computer-implemented method for synchronizing road segment parameters with images of a road segment to facilitate improved analysis or display of information about the road segments, the method comprising, via one or more local or remote processors, servers, transceivers, and/or sensors:
   (A) capturing, via an image sensor, a set of images of a road segment during a time-period;
   (B) detecting a plurality of road segment parameters associated with the road segment during the time-period, wherein the plurality of road segment parameters includes: (i) a first set of road segment parameters collected via one or more vehicle sensors and (ii) a second set of road segment parameters collected via one or more infrastructure devices disposed proximate to the road segment;
   (C) timestamping the set of images according to a first clock associated with the image sensor and the plurality of road segment parameters according to a second clock associated with the one or more vehicle sensors or the one or more infrastructure devices;
   (D) time-synchronizing the set of images and the plurality of road segment parameters according to a common clock based on an occurrence of a common event represented in the set of images and the plurality of road segment parameters;
   (E) storing the set of images and the plurality of road segment parameters as a set of stored data such that the set of images, the first set of road segment parameters, and the second set of road segment parameters are linked to a set of timestamps by which the set of images and the plurality of road segment parameters are referenceable; and
   (F) performing one or more of:
      (i) displaying the set of images and the plurality of road segment parameters according to a chronological order determined based upon the set of timestamps, or
      (ii) analyzing the set of images and the plurality of road segment parameters to identify one or more vehicle events, each characterized by a subset of the set of images and a subset of the plurality of road segment parameters.

2. The computer-implemented method of claim 1, wherein detecting the plurality of road segment parameters comprises detecting both the first set of parameters and detecting the second set of parameters.

3. The computer-implemented method of claim 1, wherein the first set of road segment parameters comprises a parameter representing a position, a heading, or a speed of a vehicle in which the one or more vehicle sensors are disposed.

4. The computer-implemented method of claim 1, wherein the first set of road segment parameters includes a first position for a first vehicle and a second position for a second vehicle, and wherein the method further comprises calculating a distance between the first and second vehicles based upon the first and second positions.

5. The computer-implemented method of claim 1, wherein the second set of road segment parameters comprises a health status parameter representing a degree of health for an infrastructure component.

6. The computer-implemented method of claim 1, wherein the second set of road segment parameters comprises an operational status of an infrastructure component.

7. The computer-implemented method of claim 6, wherein the infrastructure component is a traffic signal and wherein the operational status indicates that the streetlight was green, yellow, or red at a given time.

8. The computer-implemented method of claim 1, wherein the infrastructure device is a radar device or a motion sensing device.

9. The computer-implemented method of claim 1, wherein the second set of road segment parameters includes one or more parameters indicating an atmospheric condition at the road segment.

10. The computer-implemented method of claim 1, wherein time-synchronizing the set of images and the plurality of road segment parameters comprises:
    analyzing the set of images to identify: (i) at least one image corresponding to the occurrence of the common event, and (ii) a first time period, according to the first clock associated with the image sensor, during which the common event took place;
    analyzing the plurality of road segment parameters to identify: (i) at least one road segment parameter in the plurality of road segment parameters corresponding to the occurrence of the common event, and (ii) a second time period, according to the second clock associated with the one or more vehicle sensors or the one or more infrastructure devices, during which the common event took place; and
    setting the set of timestamps for the plurality of road segment parameters according to the common clock such that a first subset of the set of timestamps for the one or more images matches a subset of the set of timestamps for the second set of road segment parameters with respect to a time at which the common event took place.

11. A system for synchronizing road segment parameters with images of a road segment to facilitate improved analysis or display of information about the road segments, the system comprising:
    an image sensor configured to capture images of a road segment;
    a set of sensing devices including one or more of: (i) one or more vehicle sensors configured and (ii) one or more infrastructure devices;
    a computer system coupled to the image sensor and the set of sensing devices, the computer system including one or more processors and computer readable instructions that, when executed by the one or more processors, cause the computer system to:
    (A) capture, via the image sensor, a set of images of the road segment during a time-period;
    (B) detect, via the set of sensing devices, a plurality of road segment parameters associated with the road segment during the time-period, wherein the plurality of road segment parameters includes: (i) a first set of road segment parameters collected via the one or more vehicle sensors or (ii) a second set of road segment parameters collected via the one or more infrastructure devices disposed proximate to the road segment;

(C) timestamp the set of images according to a first clock associated with the image sensor and the plurality of road segment parameters according to a second clock associated with the one or more vehicle sensors or the one or more infrastructure devices;

(D) time-synchronize the set of images and the plurality of road segment parameters according to a common clock based on an occurrence of a common event represented in the set of images and the plurality of road segment parameters;

(E) store the set of images and the plurality of road segment parameters as a set of stored data such that the set of images, the first set of road segment parameters, and the second set are linked to a set of timestamps by which the set of images and the plurality of road segment parameters are referenceable; and (F) perform one or more of:
  (i) display the set of images and the plurality of road segment parameters according to a chronological order determined based upon the set of timestamps, or
  (ii) analyze the set of images and the plurality of road segment parameters to identify one or more vehicle events, each characterized by a subset of the set of images and a subset of the plurality of road segment parameters.

12. The system of claim 11, wherein the plurality of road segment parameters comprises both the first set of parameters and detecting the second set of parameters.

13. The system of claim 11, wherein the first set of road segment parameters comprises a parameter representing a position, a heading, or a speed of a vehicle in which the one or more vehicle sensors are disposed.

14. The system of claim 11, wherein the first set of road segment parameters includes a first position for a first vehicle and a second position for a second vehicle, and
  wherein the computer system further includes computer readable instructions to cause the computer system to calculate a distance between the first and second vehicles based upon the first and second positions.

15. The system of claim 11, wherein the second set of road segment parameters comprises a health status parameter representing a degree of health for an infrastructure component.

16. The system of claim 11, wherein the second set of road segment parameters comprises an operational status of an infrastructure component.

17. The system of claim 16, wherein the infrastructure component is a traffic signal and wherein the operational status indicates that the streetlight was green, yellow, or red at a given time.

18. The system of claim 11, wherein the infrastructure device is a radar device or a motion sensing device.

19. The system of claim 11, wherein the second set of road segment parameters comprises one or more parameters indicating an atmospheric condition at the road segment.

20. The system of claim 11, wherein causing the computer system to time-synchronize the set of images and the plurality of road segment parameters comprises causing the computer system to:
  analyze the set of images to identify: (i) at least one image corresponding to the occurrence of the common event, and (ii) a first time period, according to the first clock associated with the image sensor, during which the common event took place;
  analyze the plurality of road segment parameters to identify: (i) at least one road segment parameter in the plurality of road segment parameters corresponding to the occurrence of the common event, and (ii) a second time period, according to the second clock associated with the one or more vehicle sensors or the one or more infrastructure devices, during which the common event took place; and
  set the set of timestamps for the plurality of road segment parameters according to the common clock such that a first subset of the set of timestamps for the one or more images matches a subset of the set of timestamps for the second set of road segment parameters with respect to a time at which the common event took place.

* * * * *